(12) United States Patent
Zhou et al.

(10) Patent No.: US 9,537,689 B2
(45) Date of Patent: Jan. 3, 2017

(54) METHOD AND APPARATUS FOR IDENTIFYING CO-CHANNEL INTERFERENCE

(75) Inventors: Guangcai Zhou, Agoura Hills, CA (US); Ernest C. Chen, San Pedro, CA (US); Joseph Santoru, Agoura Hills, CA (US); Judith M. Wang, Irvine, CA (US)

(73) Assignee: The DirecTV Group, Inc., El Segundo, CA (US)

( * ) Notice: Subject to any disclaimer, the term of this patent is extended or adjusted under 35 U.S.C. 154(b) by 778 days.

(21) Appl. No.: 13/528,347

(22) Filed: Jun. 20, 2012

(65) Prior Publication Data

US 2012/0257697 A1 Oct. 11, 2012

Related U.S. Application Data

(63) Continuation of application No. 12/098,235, filed on Apr. 4, 2008, now Pat. No. 8,213,553, which is a
(Continued)

(51) Int. Cl.
| | | |
|---|---|---|
| H03D 1/04 | (2006.01) | |
| H04L 27/00 | (2006.01) | |
| H04B 7/185 | (2006.01) | |
| H04L 1/20 | (2006.01) | |
| H04L 25/03 | (2006.01) | |
| H04N 5/21 | (2006.01) | |
| H04N 7/16 | (2011.01) | |
| H04N 7/167 | (2011.01) | |
| H04N 21/2347 | (2011.01) | |

(Continued)

(52) U.S. Cl.
CPC ......... *H04L 27/0014* (2013.01); *H04B 7/1858* (2013.01); *H04L 1/20* (2013.01); *H04L 1/208* (2013.01); *H04L 25/03866* (2013.01); *H04N 5/21* (2013.01); *H04N 7/163* (2013.01); *H04N 7/1675* (2013.01); *H04N 21/2347* (2013.01); *H04N 21/6143* (2013.01); *H04L 2001/0093* (2013.01); *H04L 2027/0034* (2013.01); *H04L 2027/0067* (2013.01); *H04L 2027/0087* (2013.01); *H04N 5/4401* (2013.01); *H04N 17/004* (2013.01)

(58) Field of Classification Search
CPC ........... H04L 2027/0067; H04L 27/227; H04L 1/208; H04N 5/21
See application file for complete search history.

(56) References Cited

U.S. PATENT DOCUMENTS 5,550,596 A * 8/1996 Strolle et al. ................. 348/607
5,673,260 A 9/1997 Umeda et al.
(Continued)

*Primary Examiner* — Aristocratis Fotakis
(74) *Attorney, Agent, or Firm* — Gates & Cooper LLP

(57) ABSTRACT

Methods and apparatuses identifying a co-channel interference signal in communications systems are disclosed. An exemplary method comprises generating an interference signal by subtracting a reconstructed desired signal from an at least partially demodulated composite signal, and generating synchronization statistics of interference signal using different scrambling codes. The interference signal is identified as the signal associated with the scrambling code that was used to generate an interference signal having a desired synchronization statistic.

4 Claims, 20 Drawing Sheets

Related U.S. Application Data continuation-in-part of application No. 11/102,958, filed on Apr. 11, 2005, now Pat. No. 7,551,736.

(60) Provisional application No. 60/561,418, filed on Apr. 12, 2004.

(51) Int. Cl.
*H04N 21/61* (2011.01)
*H04L 1/00* (2006.01)
*H04N 5/44* (2011.01)
*H04N 17/00* (2006.01)

(56) References Cited

U.S. PATENT DOCUMENTS

| | | | |
|---|---|---|---|
| 6,131,013 | A | 10/2000 | Bergstrom et al. |
| 6,631,174 | B1 * | 10/2003 | Asahara et al. ............... 375/344 |
| 6,697,098 | B1 * | 2/2004 | Wang ............................... 348/21 |
| 6,944,434 | B2 | 9/2005 | Mattellini et al. |
| 7,403,746 | B2 | 7/2008 | Molisch |
| 2002/0058513 | A1 | 5/2002 | Klein et al. |
| 2002/0100006 | A1 * | 7/2002 | Kosugi ............... G06F 17/5022 716/108 |
| 2003/0174686 | A1 | 9/2003 | Willenegger et al. |
| 2004/0095907 | A1 | 5/2004 | Agee et al. |
| 2004/0228267 | A1 * | 11/2004 | Agrawal et al. ............. 370/203 |
| 2005/0123073 | A1 * | 6/2005 | Ginesi et al. ................. 375/326 |
| 2005/0238015 | A1 | 10/2005 | Jurgensen et al. |

* cited by examiner

METHOD AND APPARATUS FOR IDENTIFYING CO-CHANNEL INTERFERENCE

CROSS-REFERENCE TO RELATED APPLICATIONS

This application is a continuation of U.S. patent application Ser. No. 12/098,235, filed Apr. 4, 2008, for "METHOD AND APPARATUS FOR IDENTIFYING CO-CHANNEL INTERFERENCE," which is a continuation-in-part of U.S. patent application Ser. No. 11/102,958, filed Apr. 11, 2005, for "PHYSICAL LAYER HEADER SCRAMBLING IN SATELLITE BROADCAST SYSTEMS," by Lin-Nan Lee, Feng-Wen Sun, Adam Von Ancken, Joseph Santoru, Ernest C. Chen, Shamik Maitra, Dennis Lai, and Guancai Zhou, issued Jun. 23, 2009 as U.S. Pat. No. 7,551,736, which claims the benefit of the earlier filing date under 35 U.S.C. §119(e) of U.S. Provisional Application Ser. No. 60/561,418 filed Apr. 12, 2004, entitled "CO-CHANNEL INTERFERENCE MITIGATION FOR DVB-S2," each of which applications are hereby incorporated herein by reference.

This application is also related to the following applications, each of which are hereby incorporated by reference herein:

U.S. patent application Ser. No. 11/103,307, filed Apr. 11, 2005, for "METHODS AND APPARATUSES FOR MINIMIZING CO-CHANNEL INTERFERENCE", by Lin-Nan Lee, Feng-Wen Sun, Adam Von Ancken, Joseph Santoru, Ernest C. Chen, Dennis Lai, and Guancai Zhou and Tung-Sheng Lin, issued Dec. 2, 2008 as U.S. Pat. No. 7,460,832, which claims benefit of the earlier filing date under 35 U.S.C. §119(e) of U.S. Provisional Application Ser. No. 60/561,418, filed Apr. 12, 2004, entitled "CO-CHANNEL INTERFERENCE MITIGATION FOR DVB-S2";

U.S. patent application Ser. No. 11/449,912, filed Jun. 9, 2006, for "METHOD AND APPARATUS FOR MINIMIZING CO-CHANNEL INTERFERENCE", by Lin-Nan Lee, Feng-Wen Sun and Adam Von Ancken, which is a continuation of U.S. patent application Ser. No. 11/009,346, filed Dec. 10, 2004, for "METHOD AND APPARATUS FOR MINIMIZING CO-CHANNEL INTERFERENCE", by Lin-Nan Lee, Feng-Wen Sun, Adam Von Ancken, issued Jan. 9, 2007 as U.S. Pat. No. 7,161,988, which claims benefit of the earlier filing date under 35 U.S.C. §119(e) of U.S. Provisional Application Ser. No. 60/561,418, filed Apr. 12, 2004, entitled "CO-CHANNEL INTERFERENCE MITIGATION FOR DVB-S2";

U.S. patent application Ser. No. 11/009,333, filed Dec. 10, 2004, for "METHOD AND APPARATUS FOR MINIMIZING CO-CHANNEL INTERFERENCE SCRAMBLING", by Feng-Wen Sun and Iyer, issued Mar. 2, 2010 as U.S. Pat. No. 7,672,285, which claims benefit of the earlier filing date under 35 U.S.C. §119(e) of U.S. Provisional Application Ser. No. 60/583,410, filed Jun. 28, 2004, entitled "SCRAMBLING OF PHYSICAL LAYER HEADER AND PILOT SYMBOL IN DBV-S2 TO REDUCE CO-CHANNEL INTERFERENCE," and Provisional Application Ser. No. 60/585,654, filed Jul. 6, 2004, entitled "SCRAMBLING OF PHYSICAL LAY HEADER AND PILOT SYMBOL IN DVB-S2 TO REDUCE CO-CHANNEL INTERFERENCE"; and U.S. patent application Ser. No. 11/102,983, filed Apr. 11, 2005, for "SHIFTED CHANNEL CHARACTERISTICS FOR MITIGATING CO-CHANNEL INTERFERENCE", by Joseph Santoru, Ernest C. Chen, Shamik Maitra, Dennis Lai, Guancai Zhou, and Tung-Sheng Lin, issued Aug. 12, 2008 as U.S. Pat. No. 7,412,209, which claims benefit of U.S. Provisional Application Ser. No. 60/561,418, filed Apr. 12, 2004, and entitled "CO-CHANNEL INTERFERENCE MITIGATION FOR DVB-S2"; and U.S. patent application Ser. No. 11/510,244, filed Aug. 26, 2006, for "METHODS AND APPARATUSES FOR DETERMINING SCRAMBLING CODES FOR SIGNAL TRANSMISSION," by Judith Wang, Guangcai Zhou, Joseph Santoru, Ernest C. Chen, Shamik Maitra, Dennis Lai, and Tang-Sheng Lin, issued Jun. 14, 2011 as U.S. Pat. No. 7,961,880, which claims benefit under 35 U.S.C. §119(e) of U.S. Provisional Patent No. 60/711,475, filed Aug. 26, 2005, for "METHODS AND APPARATUSES FOR DETERMINING SCRAMBLING CODES FOR SIGNAL TRANSMISSION".

BACKGROUND OF THE INVENTION

1. Field of the Invention

The present invention relates to communication systems, and more particularly to methods and apparatuses for minimizing signal interference.

2. Description of the Related Art

FIGS. 1A and 1B illustrate a typical satellite based broadcast systems of the related art.

FIG. 1A shows a communications system, specifically a television broadcasting system 20, which transmits and receives audio, video, and data signals via satellite. Although the present invention is described in the context of a satellite-based television broadcasting system, the techniques described herein are equally applicable to other methods of program content delivery, such as terrestrial over-the-air systems, cable-based systems, and the Internet. Further, while the present invention will be described primarily with respect to television content (i.e. audio and video content), the present invention can be practiced with a wide variety of program content material, including video content, audio content, audio and video related content (e.g., television viewer channels), or data content.

Television broadcasting system 20 includes transmission station 26, uplink dish 30, at least one satellite 32, and receiver stations 34A-34C (collectively referred to as receiver stations 34). Transmission station 26 includes a plurality of inputs 22 for receiving various signals, such as analog television signals, digital television signals, video tape signals, original programming signals and computer generated signals containing HTML content. Additionally, inputs 22 receive signals from digital video servers having hard discs or other digital storage media. Transmission station 26 also includes a plurality of timing inputs 24, which provide electronic schedule information about the timing and content of various television channels, such as that found in television schedules contained in newspapers and television guides. Transmission station 26 converts the data from timing inputs 24 into program guide data. Program guide data may also be manually entered at the site of transmission station 26. The program guide data consists of a plurality of "objects". The program guide data objects include data for constructing an electronic program guide that is ultimately displayed on a user's television.

Transmission station 26 receives and processes the various input signals received on inputs 22 and timing inputs 24, converts the received signals into a standard form, combines the standard signals into a single output data stream 28, and continuously sends output data stream 28 to uplink dish 30. Output data stream 28 is a digital data stream that is typically compressed using MPEG2 encoding, although other compression schemes may be used.

The digital data in output data stream 28 are divided into a plurality of packets, with each such packet marked with a service channel identification (SCID) number. The SCIDs are later used by receiver 64 (shown in FIG. 1B) to identify the packets that correspond to each television channel. Error correction data is also included in output data stream 28.

Output data stream 28 is a multiplexed signal that is modulated by transmission station 26 using standard frequency and polarization modulation techniques. Output data stream 28 preferably includes 16 frequency bands, with each frequency band being either left polarized or right polarized. Alternatively, vertical and horizontal polarizations may be used.

Uplink dish 30 continuously receives output data stream 28 from transmission station 26, amplifies the received signal and transmits the signal 31 to at least one satellite 32. Although a single uplink dish and satellite are shown in FIG. 1, multiple dishes and satellites are preferably used to provide additional bandwidth, and to help ensure continuous delivery of signals.

Satellites 32 revolve in geosynchronous orbit about the earth. Satellites 32 each include a plurality of transponders that receive signals 31 transmitted by uplink dish 30, amplify the received signals 31, frequency shift the received signals 31 to lower frequency bands, and then transmit the amplified, frequency shifted signals 33 back to receiver stations 34.

Receiver stations 34 receive and process the signals 33 transmitted by satellites 32. Receiver stations 34 are described in further detail below with respect to FIG. 1B.

FIG. 1B is a block diagram of one of receiver stations 34, which receives and decodes audio, video and data signals. Typically, receiver station 34 is a "set top box," also known as an Integrated Receiver Decoder (IRD), which is usually resident in a home or multi-dwelling unit, for reception of satellite broadcasted television signals. Receiver dish 60 can be an Outdoor Unit (ODU), which is usually a smaller dish antenna mounted on a home or multi-dwelling unit. However, receiver dish 60 can also be a larger ground-mounted antenna dish if desired.

Receiver station 34 includes receiver dish 60, alternate content source 62, receiver 64, monitor 66, recording device 68, remote control 86 and access card 88. Receiver 64 includes tuner 70/demodulator/Forward Error Correction (FEC) decoder 71, digital-to-analog (D/A) converter 72, CPU 74, clock 76, memory 78, logic circuit 80, interface 82, infrared (IR) receiver 84 and access card interface 90. Receiver dish 60 receives signals 33 sent by satellite 32, amplifies the signals 33 and passes the signals 33 on to tuner 70. Tuner 70 and demodulator/FEC decoder 71 operate under control of CPU 74.

The CPU 74 operates under control of an operating system stored in the memory 78 or within an auxiliary memory within the CPU 74. The functions performed by CPU 74 are controlled by one or more control programs or applications stored in memory 78. Operating system and applications are comprised of instructions which, when read and executed by the CPU 74, cause the receiver 64 to perform the functions and steps necessary to implement and/or use the present invention, typically, by accessing and manipulating data stored in the memory 78. Instructions implementing such applications are tangibly embodied in a computer-readable medium, such as the memory 78 or the access card 88. The CPU 74 may also communicate with other devices through interface 82 or the receiver dish 60 to accept commands or instructions to be stored in the memory 78, thereby making a computer program product or article of manufacture according to the invention. As such, the terms "article of manufacture," "program storage device" and "computer program product" as used herein are intended to encompass any application accessible by the CPU 74 from any computer readable device or media.

Memory 78 and access card 88 store a variety of parameters for receiver 64, such as a list of channels receiver 64 is authorized to process and generate displays for; the zip code and area code for the area in which receiver 64 is used; the model name or number of receiver 64; a serial number of receiver 64; a serial number of access card 88; the name, address and phone number of the owner of receiver 64; and the name of the manufacturer of receiver 64.

Access card 88 is removable from receiver 64 (as shown in FIG. 1B). When inserted into receiver 64, access card 88 is coupled to access card interface 90, which communicates via interface 82 to a customer service center (not pictured). Access card 88 receives access authorization information from the customer service center based on a user's particular account information. In addition, access card 88 and the customer service center communicate regarding billing and ordering of services.

Clock 76 provides the current local time to CPU 74. Interface 82 is preferably coupled to a telephone jack 83 at the site of receiver station 34. Interface 82 allows receiver 64 to communicate with transmission station 26 as shown in FIG. 1A via telephone jack 83. Interface 82 may also be used to transfer data to and from a network, such as the Internet.

The signals sent from receiver dish 60 to tuner 70 are a plurality of modulated Radio Frequency (RF) signals. The desired RF signal is then downconverted to baseband by the tuner 70, which also generates in-phase and quadrature (I and Q) signals. These two signals are then passed to the demodulator/FEC Application Specific Integrated Circuit (ASIC) 71. The demodulator 71 ASIC then demodulates the I and Q signals, and the FEC decoder correctly identifies each transmitted symbol. The received symbols for Quaternary Phase Shift Keying (QPSK) or 8PSK signals carry two or three data bits, respectively. The corrected symbols are translated into data bits, which in turn are assembled in to payload data bytes, and ultimately into data packets. The data packets may carry 130 data bytes or 188 bytes (187 data bytes and 1 sync byte).

In addition to the digital satellite signals received by receiver dish 60, other sources of television content are also preferably used. For example, alternate content source 62 provides additional television content to monitor 66. Alternate content source 62 is coupled to tuner 70. Alternate content source 62 can be an antenna for receiving off the air National Television Standards Committee (NTSC) signals, a cable for receiving Advanced Television Standards Committee (ATSC) signals, or other content source. Although only one alternate content source 62 is shown, multiple sources can be used.

Initially, as data enters receiver 64, CPU 74 looks for initialization data which is referred to commonly in the industry as a boot object. A boot object identifies the SCIDs where all other program guide objects can be found. Boot objects are always transmitted with the same SCID, so CPU 74 knows that it must look for packets marked with that SCID. The information from the boot object is used by CPU 74 to identify packets of program guide data and route them to memory 78.

Remote control 86 emits Infrared (IR) signals 85 that are received by infrared receiver 84 in receiver 64. Other types of data entry devices may alternatively be used, by way of example and not limitation, such as an ultra-high frequency (UHF) remote control, a keypad on receiver 64, a remote keyboard and a remote mouse. When a user requests the display of a program guide by pressing the "guide" button on remote control 86, a guide request signal is received by IR receiver 84 and transmitted to logic circuit 80. Logic circuit 80 informs CPU 74 of the guide request. In response to the guide request, CPU 74 causes memory 78 to transfer a program guide digital image to D/A converter 72. D/A converter 72 converts the program guide digital image into a standard analog television signal, which is then transmitted to monitor 66. Monitor 66 then displays the TV video and audio signals. Monitor 66 may alternatively be a digital television, in which case no digital to analog conversion in receiver 64 is necessary.

Users interact with the electronic program guide using remote control 86. Examples of user interactions include selecting a particular channel or requesting additional guide information. When a user selects a channel using remote control 86, IR receiver 84 relays the user's selection to logic circuit 80, which then passes the selection on to memory 78 where it is accessed by CPU 74. CPU 74 performs an MPEG2 decoding step on received audio, video, and other packets from FEC decoder 71 and outputs the audio and video signals for the selected channel to D/A converter 72. D/A converter 72 converts the digital signals to analog signals, and outputs the analog signals to monitor 66.

Such communications systems 20, here by example which is shown a television broadcast system 20, have embraced the demand for high quality transmissions made possible by digital technology. As the packets and other data are transmitted from uplink dish 30 to receiver 64, the symbols and bits in packets intended for other receiver stations 34 are typically transmitted down from satellite 32 to receiver 64 on the same frequency, because the transmit frequency is controlled by the limitations of satellites 32, and the transmit frequencies that are available are controlled by government permission for transmission at specific frequencies within the frequency spectrum.

Further, the data frames are coded in such a manner that they can interfere with each other, and receiver 64 cannot tell which packets of data that receiver 64 is supposed to decode and present on monitor 66. Such interference is called "co-channel" interference, where one channel of data interferes with the reception and demodulation of another channel of data. In practical applications, the co-channel interference may also stem from transmission of other system operators, a satellite 32 operating in an adjacent orbital slot, or other spot transmission beams in a spot beam satellite broadcasting system 20.

As communications systems 20 transmits more data, i.e., more channels of programming on a satellite broadcast system that are viewable on monitor 66, the interference between data packets will increase, and, as such, the quality of the signal reception will be poorer.

To make optimal use of the available spectrum and to deliver a high number of different channels of programming, RF transmissions with the same frequencies may be directed to different geographic areas. However in areas bordering the different service areas, it is possible that a receiving station may detect a wanted transmission, but also other co-frequency transmissions. The unwanted transmissions are interference and may severely degrade the overall performance of the wanted channel receiver.

Traditionally, the negative effects of co-channel interference have been minimized by redesigning the frequency assignments assigned to the various transponders or satellites 32. But this will not alleviate the problem beyond a certain point. From the foregoing, it is apparent that there is a need to minimize interference beyond which, interference should be minimized. The minimization of such interference is made easier if the interfering signal can be identified from the background noise. There is therefore a need for a method and apparatus for identifying even weak interfering signal.

SUMMARY OF THE INVENTION

To minimize the limitations in the prior art, and to minimize other limitations that will become apparent upon reading and understanding the present specification, the present invention discloses methods and apparatuses for identifying a co-channel interfering signal.

In one embodiment, the method comprises the steps of (a) demodulating the composite signal to produce the desired data, (b) remodulating the desired data to generate a reconstructed desired signal, (c) subtracting the reconstructed desired signal from an at least partially demodulated composite signal to generate the interference signal, (d) at least partially demodulating the interference signal using a first scrambling code to produce a first demodulated interference signal, (e) computing a statistic of the demodulated interference signal, (f) repeating steps (d) through (e) to generate a plurality of statistics of the demodulated signal, one statistic for each of a plurality of scrambling codes and (g) identifying the interference signal according to a comparison of the plurality of statistics.

In one embodiment, the apparatus comprises a system for identifying an interference signal from a received composite signal comprising a desired signal having desired data and an interference signal comprising interference data. The system comprises a demodulator for demodulating the composite signal to produce the desired data, a remodulator, coupled to the demodulator for remodulating the desired data to generate a reconstructed desired signal, a subtractor, coupled to the remodulator, the subtractor for subtracting the reconstructed desired signal from an at least partially demodulated composite signal to generate the interference signal, a timing recovery loop, coupled to the subtractor, the timing recovery loop for generating a plurality of at least partially demodulated interference signals from the interference signal, each of the plurality of at least partially demodulated interference signals generated with one of a plurality of associated scrambling codes; and a signal analyzer, coupled to the second demodulator for computing a statistic for each of the plurality of at least partially demodulated interference signals and for identifying the interference signal according to a comparison of the plurality of statistics.

Still other aspects, features, and advantages of the present invention are inherent in the systems and methods claimed and disclosed or will be apparent from the following detailed description and attached drawings. The detailed description and attached drawings merely illustrate particular embodiments and implementations of the present invention, however, the present invention is also capable of other and different embodiments, and its several details can be modified in various respects, all without departing from the spirit and scope of the present invention. Accordingly, the drawings and description are to be regarded as illustrative in nature, and not as a restriction on the present invention.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF PREFERRED EMBODIMENTS

Figure 1A:
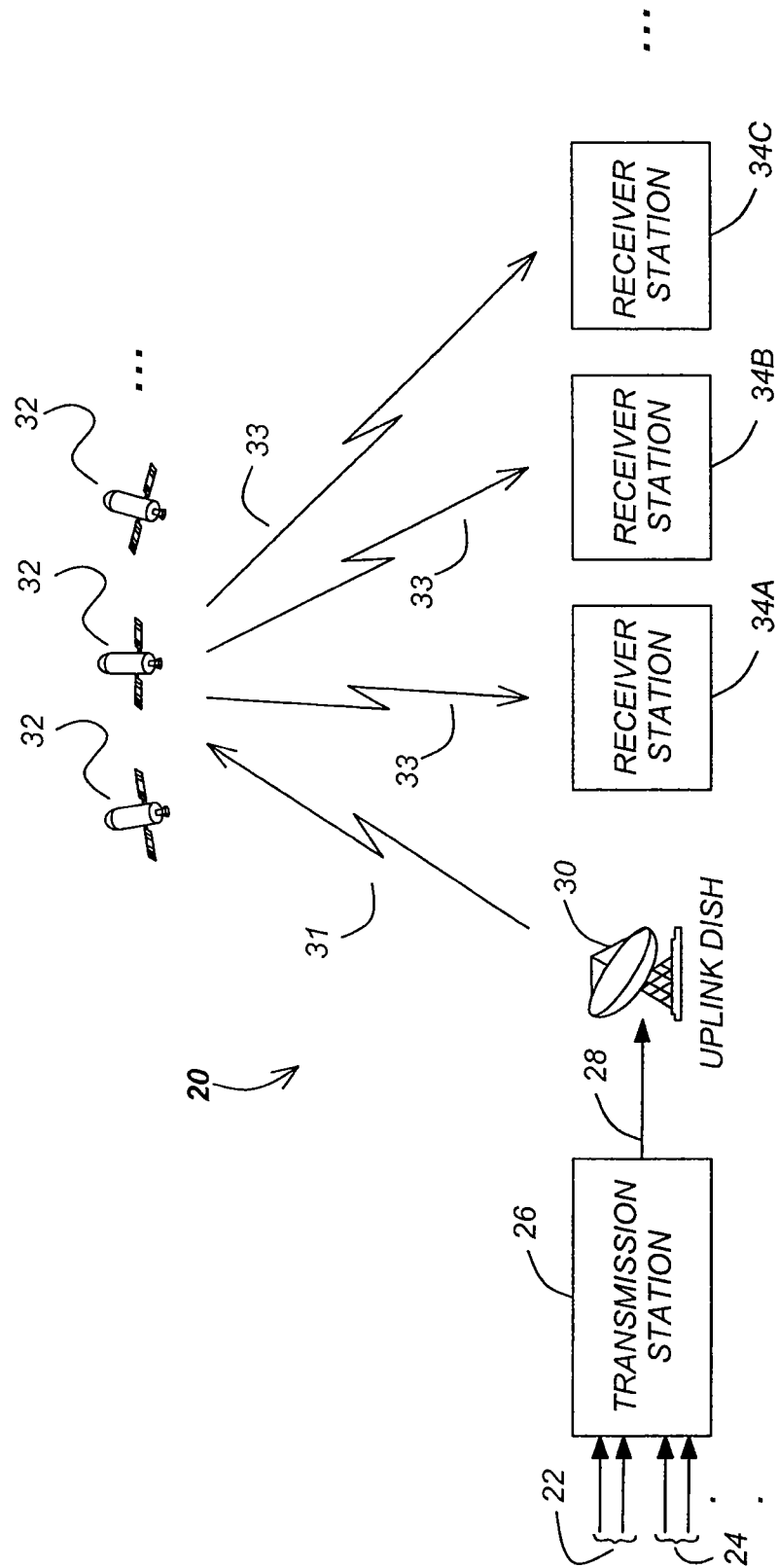
FIGS. 1A and 1B illustrate a typical satellite based broadcast systems of the related art.

An apparatus, method, and software for reducing co-channel interference in a digital broadcast and interactive system are described. In the following description, reference is made to the accompanying drawings which form a part hereof, and which show, by way of illustration, several embodiments of the present invention. It is understood that other embodiments may be utilized and structural changes may be made without departing from the scope of the present invention.

Overview

In the present invention, the digital data transmitted from transmission station 26 via signal 31, satellites 32, and signal 33 contains three main components: a header portion of a data frame, called the physical layer header, or PL header, and payload data, and optionally, additional inserted symbols, called pilot symbols, which are used by the receiver 64 to mitigate the deleterious effects of degradation in the receiver station 34, primarily phase noise. By using the PL header, the demodulator/FEC-decoder 71 can quickly acquire the correct phase at the beginning of every data frame. For many 8PSK and QPSK transmission modes, pilot symbols are also needed to track the phase noise more accurately. However, in certain instances, when the PL headers for a desired signal and an interfering co-frequency signal align in time, the interference is so great that the demodulator/FEC-decoder 71 cannot determine with necessary accuracy the phase of the carrier frequency associated with the wanted signal. This means that as the demodulator 71 tries to maintain a phase lock on the desired signal, the undesired signal presents the same header symbols or pilot symbols, and the demodulator 71 can be confused by the presence of the undesired signal, and therefore unable to track the phase of the desired signal. Such confusion in the demodulator 71 is known in the art as having the demodulator 71 being "pulled off" of the desired signal. If the demodulator 71 is pulled by 45 degrees from the optimal constellation point for a QPSK transmission, the demodulator will not identify the symbols correctly. This will introduce errors, and if not rectified quickly, the data errors will be identified as a loss of lock. This, in turn, will lead the microprocessor 74 to command the demodulator 71 to reacquire the signal, which leads to loss of data until the desired signal is reacquired. Such a loss of data would present incorrect data on monitor 66, and possibly a service interruption on monitor 66 as viewed by a viewer. Rather than viewing a desired television channel with motion and dialog on a given monitor 66, the co-channel interference would cause the viewer to see the monitor fade to a dark screen, or see a garbled picture, or hear garbled audio. It is apparent that co-channel interference can create deleterious effects on a television broadcast system 20.

The present invention provides several factors that will mitigate the effect of such co-channel interference.

A first approach is to provide a different Start-Of-Frame (SOF) sequence and/or scrambling code to those channels that may be affected by such co-channel interference. The demodulator 71 can then look for a specific SOF when asked to tune to one or the other of the data frames, and be able to tell the difference between them. Alternatively, or in conjunction, the codes used to scramble such interfering signals can be sufficiently different that the cross-correlation between the two data frames is reduced to the point where the demodulator 71 can lock onto the desired transmission and disregard the deleterious effect of the interfering channel. Further, different scrambling techniques can be used for PL Headers on different channels, and/or different scrambling techniques or codes can be applied to the payload data, either in conjunction with scrambling of the PL Headers or separate from the PL Headers, which will reduce or eliminate the pulling-off effect.

Another method to reduce co-channel interference effects is to sense when a demodulator 71 is being drawn away from tracking a specific phase of a given signal. Such a drawing away, or "pulling off" of the phase track would indicate the presence of the interfering data frame, and the demodulator 71 can then choose not to update the phase track from the PL header or the pilot symbols.

Another method of the present invention is to offset the transmission frequency of the modulated RF signal by a small amount, e.g., 1 MHz, so the demodulator 71 can search for the SOF portion of the PL header in a different frequency space for a given data frame. The number of offsets, and in which direction, e.g., either up or down in terms of frequency, can be based on the number of independent RF transmissions, or satellite 32 downlink beams, that will be present simultaneously and potentially causing the co-channel interference. Further, the data frames within a signal can also be offset in terms of time, e.g., one data frame starts first, and the interfering data frame is delayed by a certain number of symbols, such that the SOF portion of the PL header will occur at different times for each of the data frames. This will protect the desired signal demodulator 71 from being pulled off by the simultaneous presence of a PL header from an interference signal.

Another method of the present invention is to use different shift key modes within each of the data frames. Typically, a QPSK transmission mode will be more resistant to co-channel interference effects than an 8PSK transmission mode.

System Diagram

Figure 1B:
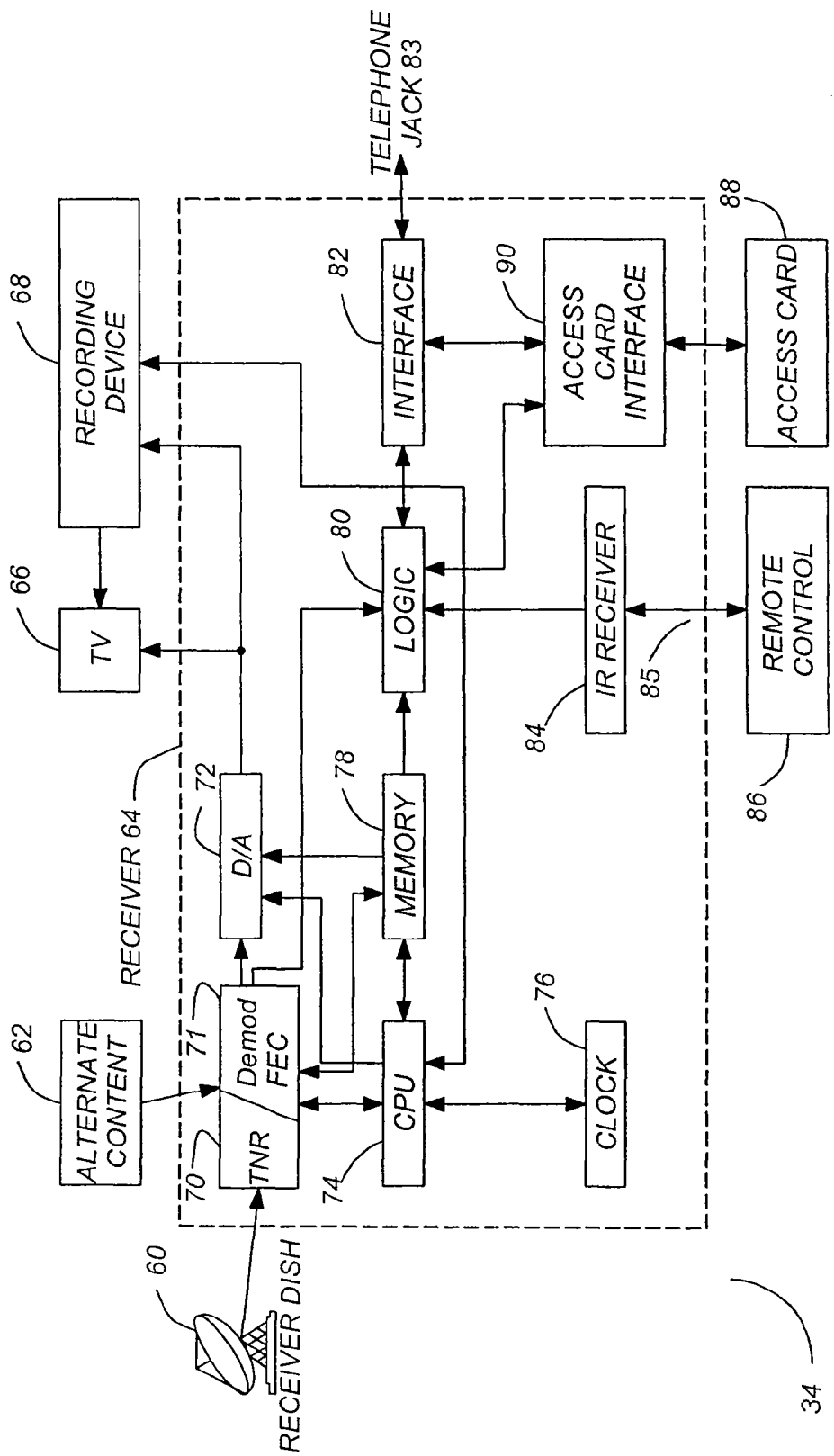
Figure 2A:
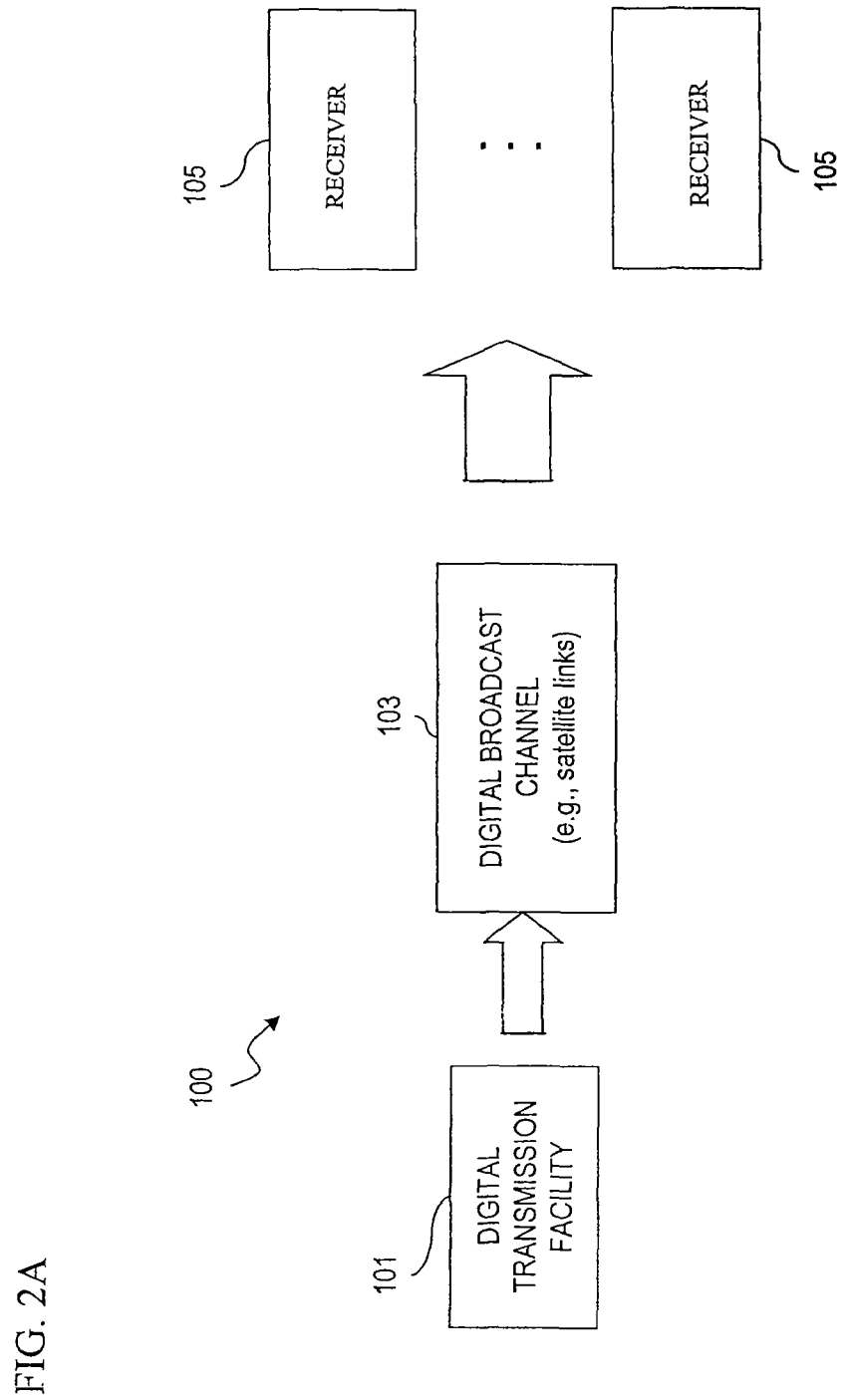
FIG. 2A is a diagram of a digital broadcast system capable of minimizing co-channel interference, according to an embodiment of the present invention.

FIG. 2A is a diagram of a digital broadcast system 100 capable of minimizing co-channel interference, according to an embodiment of the present invention. The digital communications system 100 includes a digital transmission facility 101 that generates signal waveforms for broadcast across a communication channel 103 to one or more receivers 105. According to one embodiment of the present invention, the communication system 100 is a satellite communication system that supports, for example, audio and video broadcast services as well as interactive services. Such a communications system is shown in FIGS. 1A and 1B, and described hereinabove. Interactive services include, for example, electronic programming guides (EPGs), high-speed internet access, interactive advertising, telephony, and email services. These interactive services can also encompass such television services as Pay Per View, TV Commerce, Video On Demand, Near Video On Demand and Audio On Demand services. In this environment, the receivers 105 are satellite receivers. Satellite receivers are typically resident in "set top boxes," also known as Integrated Receiver/Decoders (IRDs), which may include digital video recorders (DVRs).

In broadcast applications, continuous mode receivers 105 are widely used. Codes that perform well in low signal-to-noise (SNR) environments are at odds with these receivers 105 with respect to synchronization (e.g., carrier phase and carrier frequency). Physical layer header and/or pilot symbols can be used for such synchronization. Accordingly, an important consideration with respect to system performance is that of co-channel interference on physical layer header and/or pilot symbols. Because physical layer header and/or pilots are used for acquiring and/or tracking carrier phase and carrier frequency, such interference can degrade receiver performance.

Many digital broadcast systems 100 require use of additional training symbols beyond that of the normal overhead bits in a frame structure for their synchronization processes. The increase in overhead is particularly required when the Signal-to-Noise (SNR) is low; such an environment is typical when high performance FEC codes are used in conjunction with high order modulation. Traditionally, continuous mode receivers utilize a feedback control loop to acquire and track carrier frequency and phase. Such approaches that are purely based on feedback control loops are prone to strong Radio Frequency (RF) phase noise and thermal noise, causing unacceptable cycle slip rates and an error floor on the overall receiver performance. Thus these approaches are burdened by increased overhead in terms of training symbols for certain performance target, in addition to limited acquisition range and long acquisition time. Further, these conventional synchronization techniques are dependent on the particular modulation scheme, thereby hindering flexibility in use of modulation schemes.

In system 100, the receivers 105 achieve carrier synchronization by examining the preambles, headers, and/or unique scrambling codes or unique words (UW) that are embedded in broadcast data frame structures (shown in FIG. 4A), thereby reducing the use of additional overhead specifically designated for training purposes. The receivers 105 are more fully described below with respect to FIG. 3.

In this discrete communications system 100, the transmission facility 101 produces a discrete set of possible messages representing media content (e.g., audio, video, textual information, data, etc.); each of the possible messages has a corresponding signal waveform. These signal waveforms are attenuated, or otherwise altered, by communications channel 103. To combat the noise in the broadcast channel 103, the transmission facility 101 utilizes forward-error-correction codes, such as Low Density Parity Check (LDPC) codes, or a concatenation of different FEC codes.

The LDPC or other FEC code or codes that are generated by the transmission facility 101 facilitate high speed implementation without incurring any performance loss. These structured LDPC codes output from the transmission facility 101 avoid assignment of a small number of check nodes to the bit nodes already vulnerable to channel errors by virtue of the modulation scheme (e.g., 8PSK). Such LDPC codes have a parallelizable decoding process (unlike turbo codes), which advantageously involves simple operations such as addition, comparison and table look-up. Moreover, carefully designed LDPC codes do not exhibit any sign of error floor, e.g., there is no decrease in errors even though the signal-to-noise ratio increases. If an error floor were to exist, it would be possible to use another code, such as a Bose/Chaudhuri/Hocquenghem (BCH) code or other codes, to significantly suppress such error floor.

According to one embodiment of the present invention, the transmission facility 101 generates, using a relatively simple encoding technique as explained below in FIG. 2, LDPC codes based on parity check matrices (which facilitate efficient memory access during decoding) to communicate with the satellite receiver 105.

Transmitter Functions

Figure 2B:
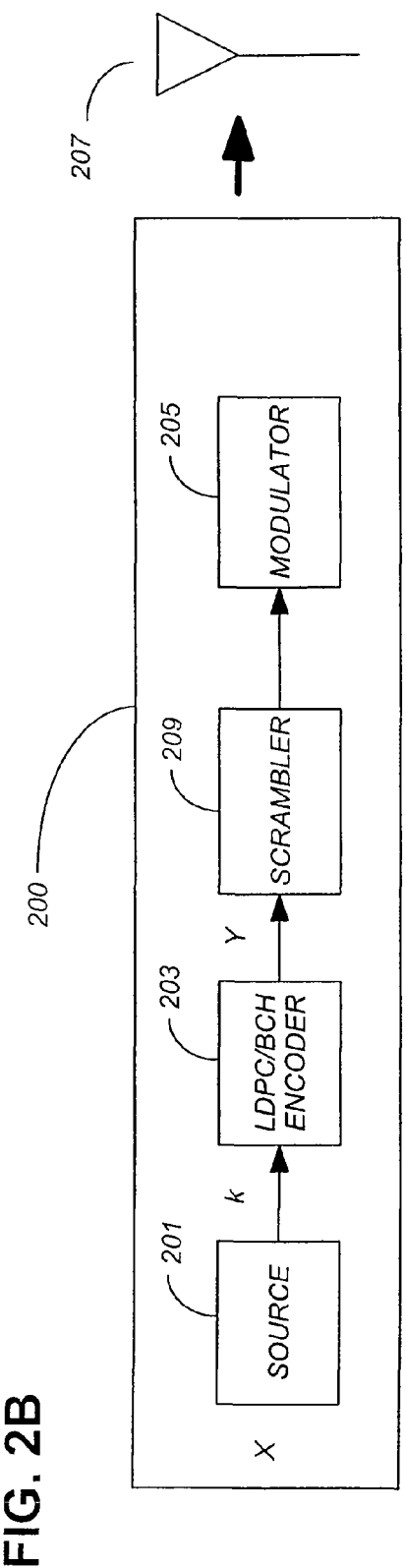
FIG. 2B is a diagram of an exemplary transmitter employed in the digital transmission facility of the system of FIG. 2A.

FIG. 2B is a diagram of an exemplary transmitter employed in the digital transmission facility of the system 100 of FIG. 2A. A transmitter 200 in transmission facility 101 is equipped with an LDPC/BCH encoder 203 that accepts input from an information source 201 and outputs coded stream of higher redundancy suitable for error correction processing at the receiver 105. The information source 201 generates k signals from a discrete alphabet, X. LDPC codes are specified with parity check matrices. Encoding LDPC codes requires, in general, specifying the generator matrices. BCH codes are included to reduce the error floor of system 20, which improves error correction performance.

Encoder 203 generates signals from alphabet Y to a modulator 205, using a simple encoding technique that makes use of only the parity check matrix by imposing structure onto the parity check matrix. Specifically, a restriction is placed on the parity check matrix by constraining certain portion of the matrix to be triangular for fast encoding and decoding. Such a restriction results in negligible performance loss, and therefore, constitutes an attractive trade-off.

Scrambler 209 scrambles the FEC encoded symbols in accordance with the present invention to minimize co-channel interference, as will be more fully described below.

Modulator 205 maps the scrambled messages from scrambler 209 to signal waveforms that are transmitted to a transmit antenna 207, which emits these waveforms over the communication channel 103. The transmissions from the transmit antenna 207 propagate to a demodulator, as discussed below. In the case of a satellite communication system, the transmitted signals from the antenna 207 are relayed via a satellite.

Demodulator

Figure 3:
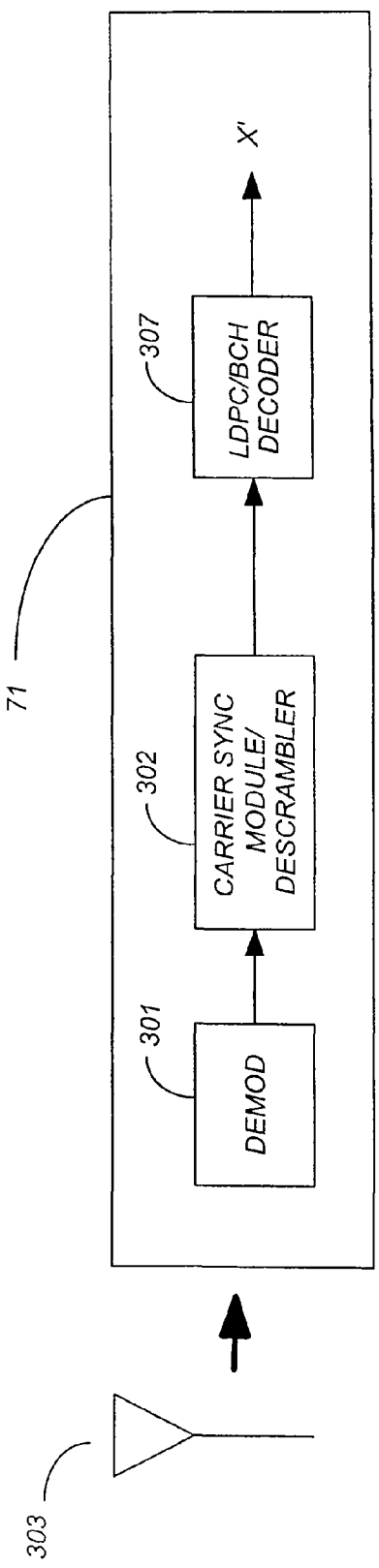
FIG. 3 is a diagram of an exemplary demodulator in the system of FIG. 2A.

FIG. 3 is a diagram of an exemplary demodulator/FEC decoder 71 in the system of FIG. 1. The demodulator/FEC decoder 71 comprises a demodulator 301, a carrier synchronization module/descrambler 302, and a LDPC/BCH decoder 307 and supports reception of signals from the transmitter 200 via antenna 303. According to one embodiment of the present invention, the demodulator 301 provides filtering and symbol timing synchronization of the LDPC encoded signals received from antenna 303, and carrier synchronization module 302 provides frequency and phase acquisition and tracking and descrambling of the signals output from the demodulator 301. After demodulation, the signals are forwarded to a LDPC decoder 307, which attempts to reconstruct the original source messages by generating messages, X'.

With respect to the receiving side, if both the desired and interfering carriers use the same modulation and coding configuration (or mode), when the frame header (shown in FIG. 4A) are aligned exactly in time while their relative frequency offset are small, the interference can cause significant errors in phase estimation for the demodulator. As a result, the demodulator can put out errors periodically. This condition occurs when frequency and symbol clock of the signals in question are sufficiently close, although they may be drifting with respect to each other.

Frame Structure

Figure 4A:
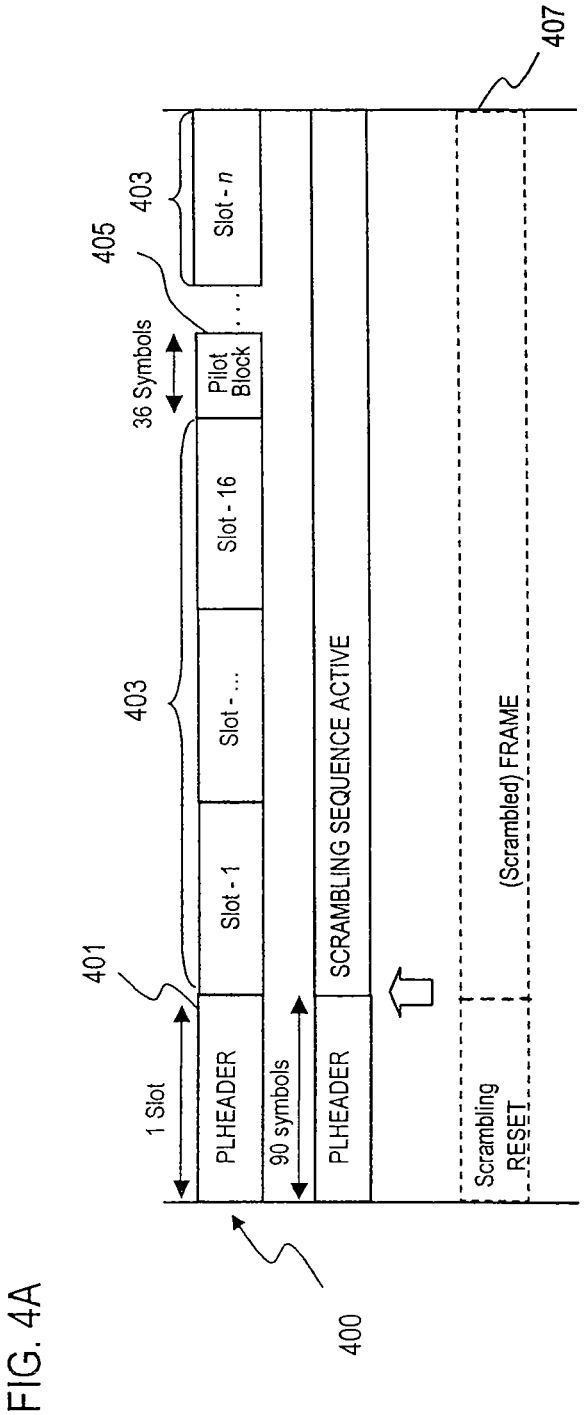
FIGS. 4A and 4B are diagrams, respectively, of a frame structure used in the system of FIG. 2A, and of logic for scrambling the frame headers with different Unique Words (UWs) for respective frames transmitted over adjacent co-channels, in accordance with an embodiment of the present invention.

FIG. 4A is a diagram of an exemplary frame structure used in the system of the present invention. By way of example, an LDPC coded frame 400, which can support, for example, satellite broadcasting and interactive services, is shown. The frame 400 includes a Physical Layer Header (denoted "PL Header") 401, which occupies one slot, as well as other slots 403 for data or other payload. In addition, the frame 400, according to one embodiment of the present invention, utilizes a pilot block 405 after every 16 slots to aid synchronization of carrier phase and frequency. It is noted that the pilot blocks 405 are optional. Although shown after 16 slots 403, the pilot block (or pilot sequence) 405, which can represent a scrambled block, can be inserted anywhere along the frame 400.

In an exemplary embodiment, the pilot insertion process inserts pilot blocks every 1440 symbols. Under this scenario, the pilot block includes 36 pilot symbols. For instance, in the physical layer frame 400, the first pilot block is thus inserted at the end of 1440 payload symbols after the PL Header 401, the second pilot block is inserted after 2880 payload symbols, and etc. If the pilot block position coincides with the beginning of the next PL Header 401, then the pilot block 405 is not inserted.

The carrier synchronization module 302 (FIG. 3), according to an embodiment of the present invention, utilizes the PL Header 401 and/or pilot block 405 for carrier frequency and phase synchronization. The PL Header 401 and/or pilot block 405 may be used for carrier synchronization, i.e., for assisting with the operation of frequency acquisition and tracking, and phase tracking loop. As such, the PL Header 401 and pilot block 405 are considered "training" or "pilot" symbols, and constitute, individually or collectively, a training block. Each PL header 401 typically comprises a Start Of Frame (SOF) section comprising 26 symbols, and a Physical Layer Signaling Code field (PLS code) field comprising 64 symbols. Typically, the SOF section is identical for all PL headers 401 for all of the signals being transmitted without further scrambling.

For QPSK, 8PSK, and other modulations, the pilot sequence 405 is a 36-symbol long segment (with each symbol being $(1+j)/\sqrt{2}$); that is, 36 symbols (PSK). In the frame 400, the pilot sequence 405 can be inserted after 1440 symbols of data. Under this scenario, the PL Header 401 can have 64 possible formats depending on the modulation, coding and pilot configuration.

When the PL headers 401 of the interfering carrier and the desired carrier (i.e., co-channels) are aligned in time, the coherent contribution from the interfering PL Header 401 can introduce significant phase error, causing unacceptable degradation in performance. Likewise, if both co-channels use pilot symbols (with both using the same Gold code sequence for the pilot blocks 405), the pilot blocks 405 will be scrambled exactly the same way such that the coherent contribution of the pilot block in the interfering carrier (or co-channel) is still problematic.

To mitigate the effect of co-channel interference, the frame 400 is scrambled, in pilot mode. In general, in this mode, the non-header portion 407 is scrambled with a Gold code sequence unique to the transmitter. This compares with a broadcast mode of the Digital Video Broadcast S2 Standard (DVB-S2), for example, in which the entire frame 400, including the pilot block 405, is scrambled using a common code; e.g., all the receivers 105 are supplied with the same Gold sequence. The scrambling process is further explained with respect to FIGS. 4B, 5, 6, 8 and 9. As used herein, the scrambled pilot sequence is also denoted as a "pilot-segment" of the frame 400.

I and Q Swapping

Another method that can be used in accordance with the present invention is to swap the in-phase (I) and quadrature phase (Q) portions of one signal while leaving the co-channel phases intact. Such a phase swap will destroy phase coherence in the co-channel data frames 400, which minimizes or prevents interference between the two data frames 400 in the co-channels.

Applying Different Scrambling Codes to the PL Header

Figure 4B:
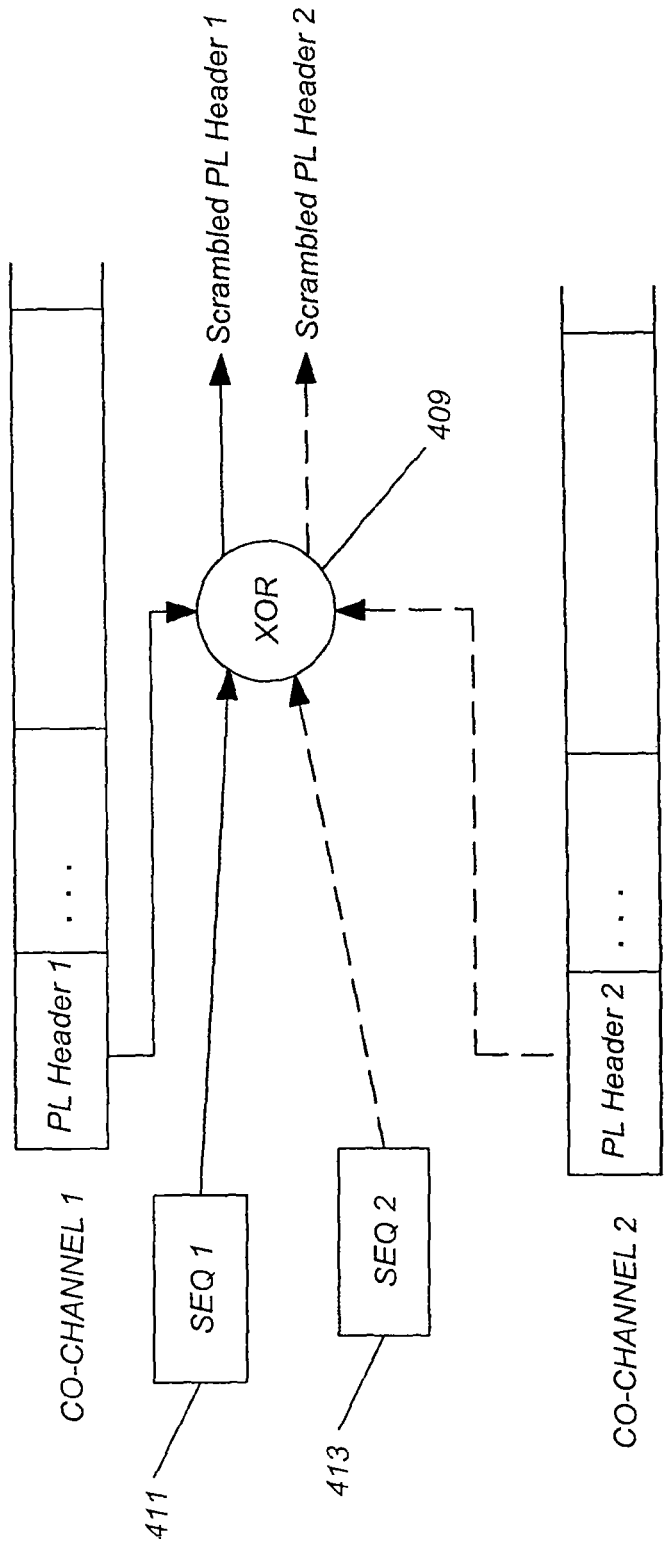

As seen in FIG. 4B, to reduce the impact of co-channel interference, several different Unique Word (UW) patterns of the same length as the PL header 401 can be utilized for the respective co-channels to scramble the PL headers 401. For example, an eXclusive-OR (via an XOR logic 409) of the different UW patterns 411, 413 with the PL HEADER 401 can be performed for the desired and interfering carriers (i.e., co-channels). Under this approach, power associated with the PL Header 401 of the interfering carrier no longer adds coherently to the PL Header 401 of the desired carrier.

Although the frame 400 is described with respect to a structure that supports satellite broadcasting and interactive services (and compliant with the DVB-S2 standard), it is recognized that the carrier synchronization techniques of the present invention can be applied to other frame structures.

Further, individual PL headers 401 can be scrambled prior to attaching the PL header 401 to the frame 400, and individual PL headers 401 can be scrambled without other PL headers 401 being scrambled. The invention envisions selecting scrambling codes (or seeds to generate the scrambling codes), or, alternatively, selecting no scrambling code, based on the expected co-channel interference between two data frames 400. The PL headers can be again scrambled as part of the data frame 400 scrambling as shown in FIG. 5, or otherwise encrypted using an encryption schema.

The codes 411 and 413 that are used to scramble the PL header 401 can be Gold codes as described herein, other seeded codes, or other coding schemes, without departing from the scope of the present invention. Such codes, or seeds for such codes, can be selected from a limited number of codes or seeds, and such codes or seeds can be sent to receiver 64 for use in descrambling the data frames 400 to demodulate and descramble the frames 400. The limited number of codes or seeds can be selected based on a number of factors, including the number of satellites 32, or the number of expected co-channel interferences in communication system 100.

Co-Channel Scrambling

Figure 5:
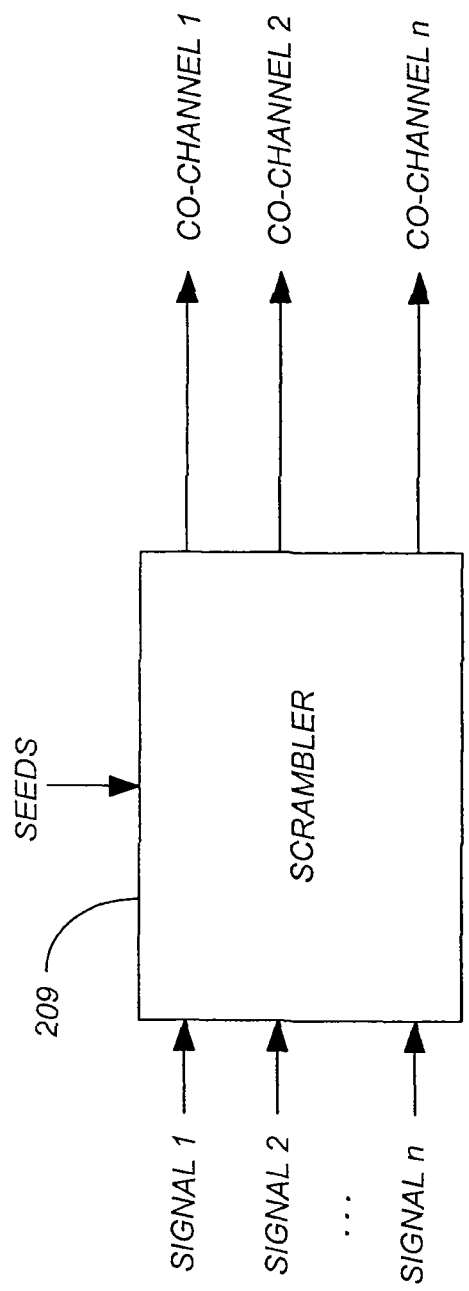
FIG. 5 is a diagram of a scrambler for isolating co-channel interference according to various embodiments of the present invention.

FIG. 5 is a diagram of a sequence scrambler for isolating co-channel interference, according to an embodiment of the present invention. A scrambling code is a complex sequence that can be constructed from a Gold code, according to one embodiment of the present invention. That is, a scrambler 209 generates a scrambling sequence Rn(i). Table 1 defines how the scrambling sequence Rn(i) scrambles the frame using the scrambler 209, according to the scrambler sequence generator of FIG. 6. In particular, Table 1 shows the mapping of an input symbol to an output symbol based on the output of the scrambler 209.

TABLE 1

| Rn(i) | Input(i) | Output(i) |
|---|---|---|
| 0 | I + jQ | I + jQ |
| 1 | I + jQ | −Q + jI |
| 2 | I + jQ | −I − jQ |
| 3 | I + jQ | Q − jI |

Using different seeds for either of such two m-sequence generators can generate different Gold sequences. By using different seeds for different services, the mutual interference can be reduced.

In a broadcast mode, the 90 symbol physical layer header 401 can remain constant for a particular physical channel. The Gold sequence is reset at the beginning of each frame, and thus, the scrambled pilots are periodical as well with a period equal to the frame length. Because the information carrying data in a frame varies and appears to be random, the co-channel interference is random and degrades the operating signal-to-noise ratio. Without using this scheme, due to the nature of time-invariance of the original physical layer header 401 and the pilot block 405, the carrier and phase estimation will be skewed for a receiver depending on these pilots and physical layer header for such acquisition and tracking. This will degrade the performance beyond those of signal-to-noise ratio degradation associated with random data.

The scrambler 209 utilizes different scrambling sequences (n in FIG. 6) to further isolate the co-channel interference. One scrambling sequence is provided for the physical layer header and one for the pilots. Different pilots are specified in terms of different seeds from the n value of the Gold sequences.

As such, the present invention contemplates separate scrambling of several combinations of PL headers 401, pilot blocks 405, and payload 403 for co-channel interference mitigation. Depending on the complexity of the system, the PL headers 401 and pilot blocks 405 (if present) for a given channel can be scrambled using a different code than the co-channel without scrambling the payload 403. In essence, all non-payload 403 symbols that are present in one channel 400 are scrambled using one code, and all non-payload 403 symbols in another channel 400 are scrambled using a different code.

Further, the PL headers 401 and pilot blocks 405 (if present) for two different channels can be scrambled using different scrambling codes, and the payloads 403 for those channels can be scrambled using other codes. For example, a first scrambling sequence can be applied to a first PL header 401, and a second scrambling sequence can be applied to a second PL header 401. The first payload 403 has a third scrambling sequence applied (typically a Gold code), and the second payload has a fourth scrambling sequence applied (also typically a Gold code).

It is also contemplated within the present invention that there can be systems that use mated pairs of codes for the PL header 401 and the payload 403. So, a given scrambling code used on a PL header 401 is always used with a scrambling code used to scramble the payload 403 for that PL header 401. These code pairs can be applied to any signal 400, and can be re-assigned from one signal 400 to another signal 400 as desired.

It is also contemplated within the scope of the present invention that each payload 403 signal within system 20 receives a unique scrambling code. Further, each PL header 401 can receive a unique scrambling code, which can be mated with scrambling codes for the payloads 403 if desired.

Although described as a single scrambling sequence for a given channel 400, the present invention also contemplates that scrambling sequences can be changed or rotated after a given number of frames have been transmitted. The scrambling sequences for the PL header 401, the payload 403, or both can be rotated on a random or periodic basis as desired without departing from the scope of the present invention.

Gold Sequence Generator Diagram

Figure 6:
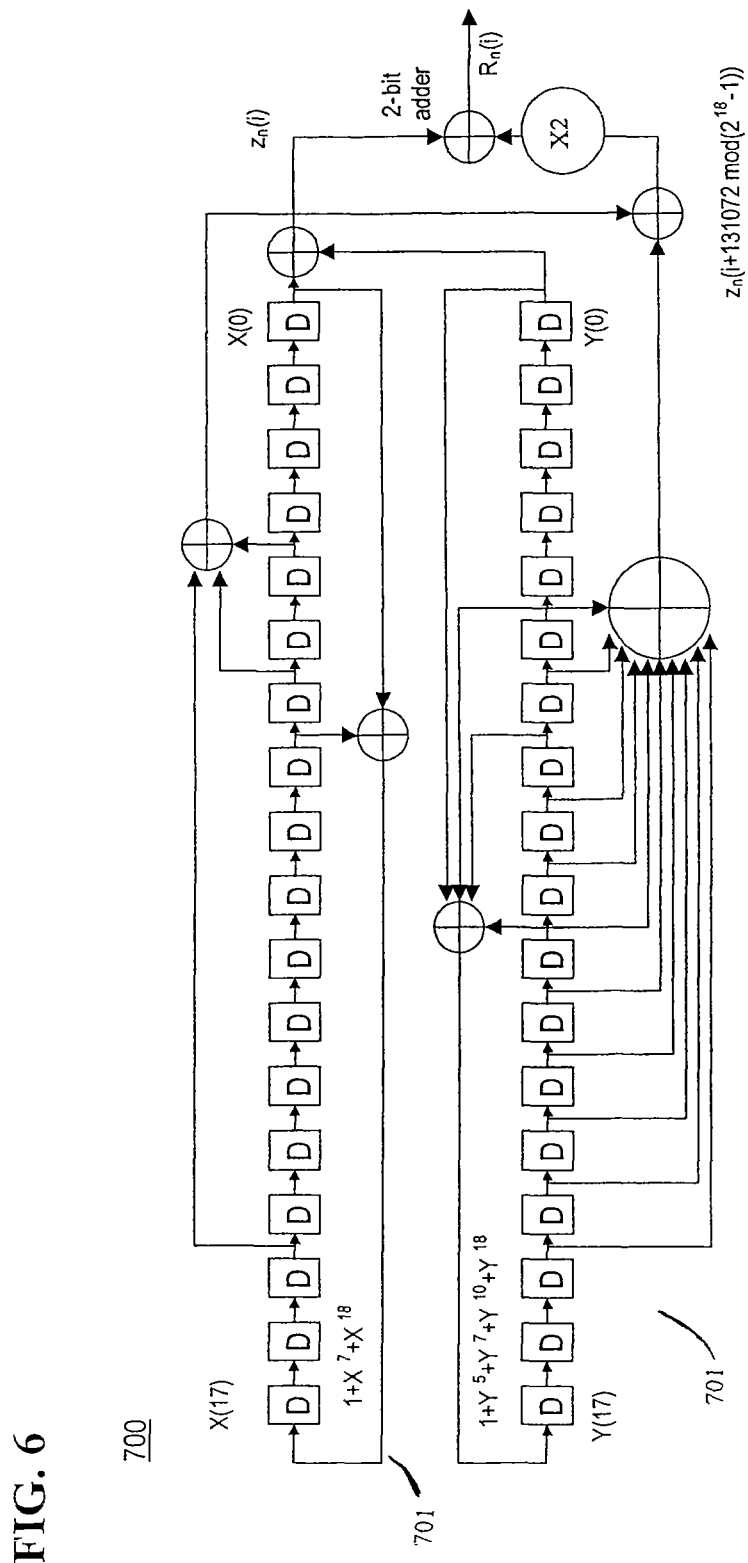
FIG. 6 is a diagram of an exemplary scrambling sequence generator used in the scrambler of FIG. 5.

FIG. 6 is a diagram of an exemplary scrambling sequence generator used in the scrambler of FIG. 5. Although a Gold sequence generator is shown in FIG. 6, other sequence generators can be used within the present invention without departing from the scope of the present invention. By using different sequences for the co-channels, i.e., different initialization seeds for each of the co-channels, the interference can be mitigated. In this example, a Gold sequence generator 700 employs the preferred polynomials of $1+X^7+X^{18}$ and $1+Y^5+Y^7+Y^{10}+Y^{18}$. For example, to sustain n co-channels, in an exemplary embodiment of the present invention, the seeds can be programmed into an m-sequence generator 701. The polynomials are initialized based on the given seed for that co-channel. The seeds are generated, according to one embodiment of the present invention, using a search algorithm that minimizes the worst cross-correlation between every pair of the co-channel pilot-segments.

Generating Different PL Sequences

Figure 8:
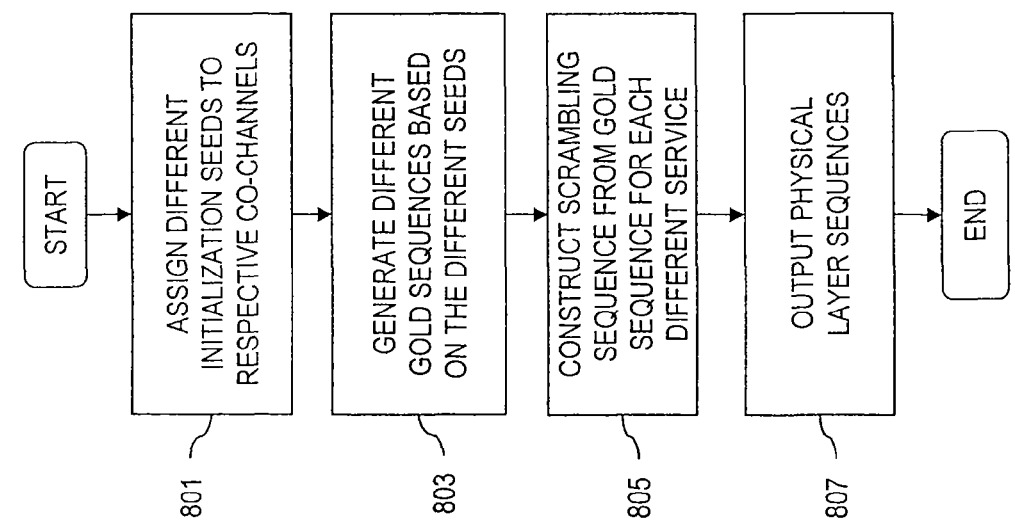
FIG. 8 is a flowchart of a process for generating different physical layer sequences, according to an embodiment of the present invention.

FIG. 8 is a flowchart of a process for generating different physical layer sequences, according to an embodiment of the present invention. In step 801, different initialization seeds are assigned to the respective co-channels. Next, Gold sequences are generated based on the seeds, per step 803. A scrambling sequence is then constructed, as in step 805, from the Gold sequence for each different service. In step 807, the physical layer sequences are output by the scrambler 209.

The present invention can use different initialization seeds for each of the channels, and, thus, any pilot signals 405 in each signal will contain different symbols, which greatly reduces cross-correlation between two interfering co-channels. Once the pilot symbols 405 are distinguishable, the demodulator 71 can track one data frame 400 based almost entirely on the pilot symbols 405, which minimizes the interference between the data frames 400.

Figure 9:
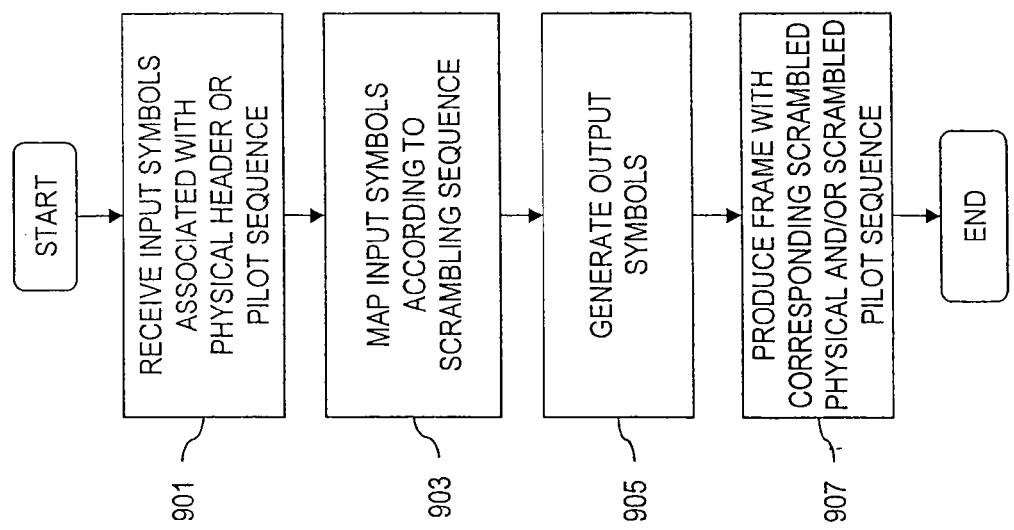
FIG. 9 is a flowchart of process for generating scrambled physical headers, according to an embodiment of the present invention.

FIG. 9 is a flowchart of process for generating scrambled physical headers, according to an embodiment of the present invention. The transmitter 200 (of FIG. 2A) receives input symbols associated with the physical header or pilot sequence, as in step 901. In step 903, the transmitter maps the input symbols according to a scrambling sequence generated by the scrambler 209. The output symbols are then generated, per step 905. Thereafter, the transmitter outputs a frame with a scrambled physical and/or scrambled pilot sequence (step 907).

Figure 10:
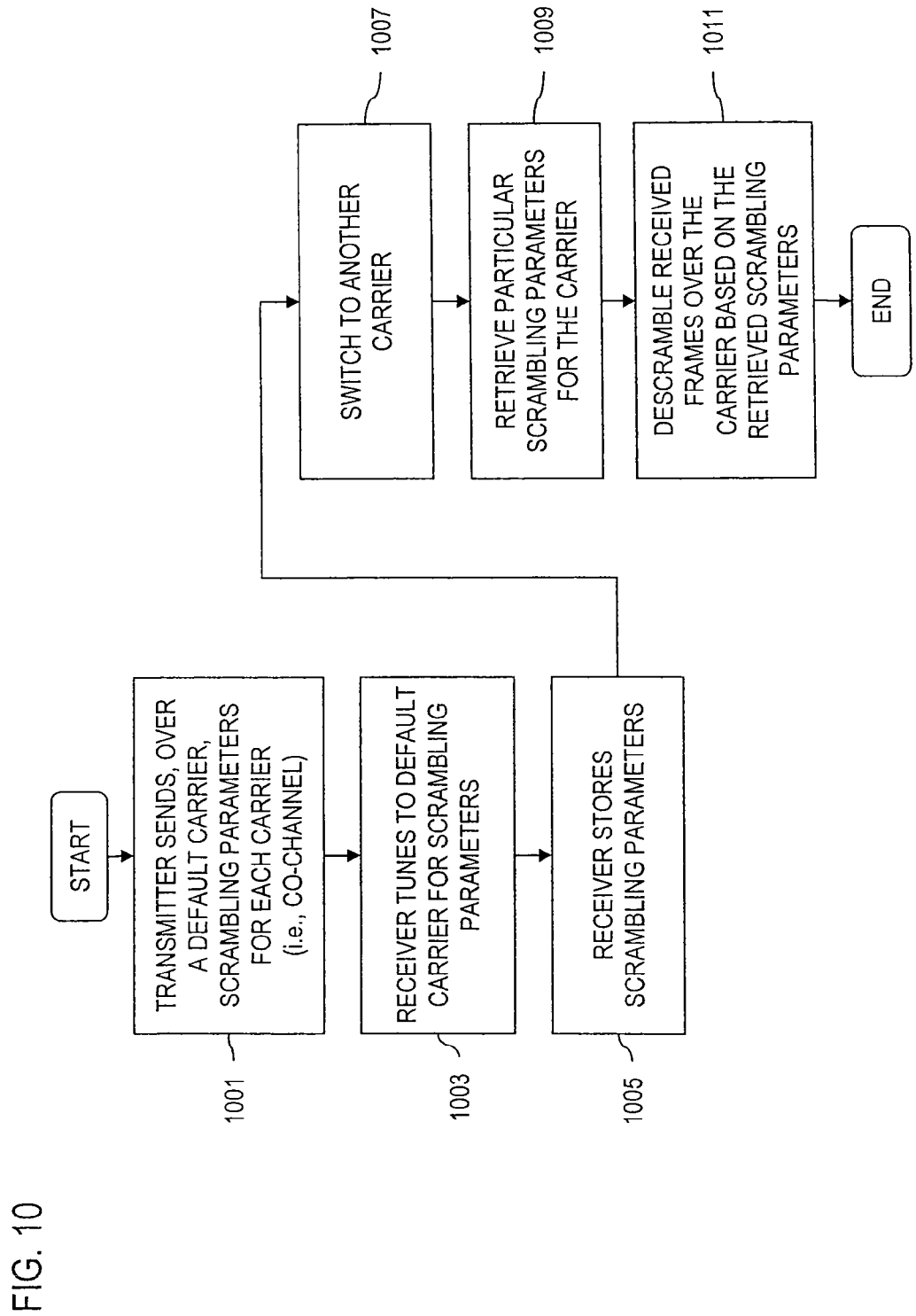
FIG. 10 is a flowchart of process for transmitting scrambling parameters, according to an embodiment of the present invention.

FIG. 10 is a flowchart of process for transmitting scrambling parameters, according to an embodiment of the present invention. As discussed above, for the pilot mode, different Gold sequences are employed for different services to reduce co-channel interference. In addition, use of different UW patterns of the same length as the header 401 can minimize coherent addition of the headers 401. Consequently, a receiver needs the appropriate UW to unscramble the PL Header 401, as well as the appropriate Gold sequence to unscramble the payload data and the pilot block.

In step 1001, the transmitter (e.g., transmitter 200) sends scrambling parameters for each of the supported carriers (co-channels) to receiver 64. This is typically done by embedding the scrambling parameters into the Advanced Program Guide (APG) portion of payload 403, which is available on at least one transponder from satellites 32. Typically, the APG portion of payload 403 is available on every transponder from satellites 32, and receiver 64 can be directed to receive the APG on a specific transponder on startup if such a direction to receiver 64 is necessary. Further, the transmitter 200 can use other methods for transmitting the scrambling codes, such as via telephone lines that interact with receiver 64 via interface 82. According to one embodiment of the present invention, the scrambling parameters include an index of the scrambling codes, and the scrambling sequence number for each carrier or channel. The default carrier supports a frame whose PL Header 401 is not scrambled and the payload data 403 (and pilot block 405 if any) are scrambled by a default Gold sequence, e.g., Sequence No. 0. The receiver 65, as in step 1003, initially tunes to this carrier to obtain the scrambling parameters, and stores the scrambling parameter sets for all carriers to be received (per step 1005). When the receiver switches to another carrier, as in step 1007, the particular scrambling parameters for the carrier are retrieved, per step 1009. In particular, the stored index is retrieved to find the correct UW as well as the stored Gold sequence number. In step 1011, the frames received over the particular carrier are descrambled appropriately.

Figure 11:
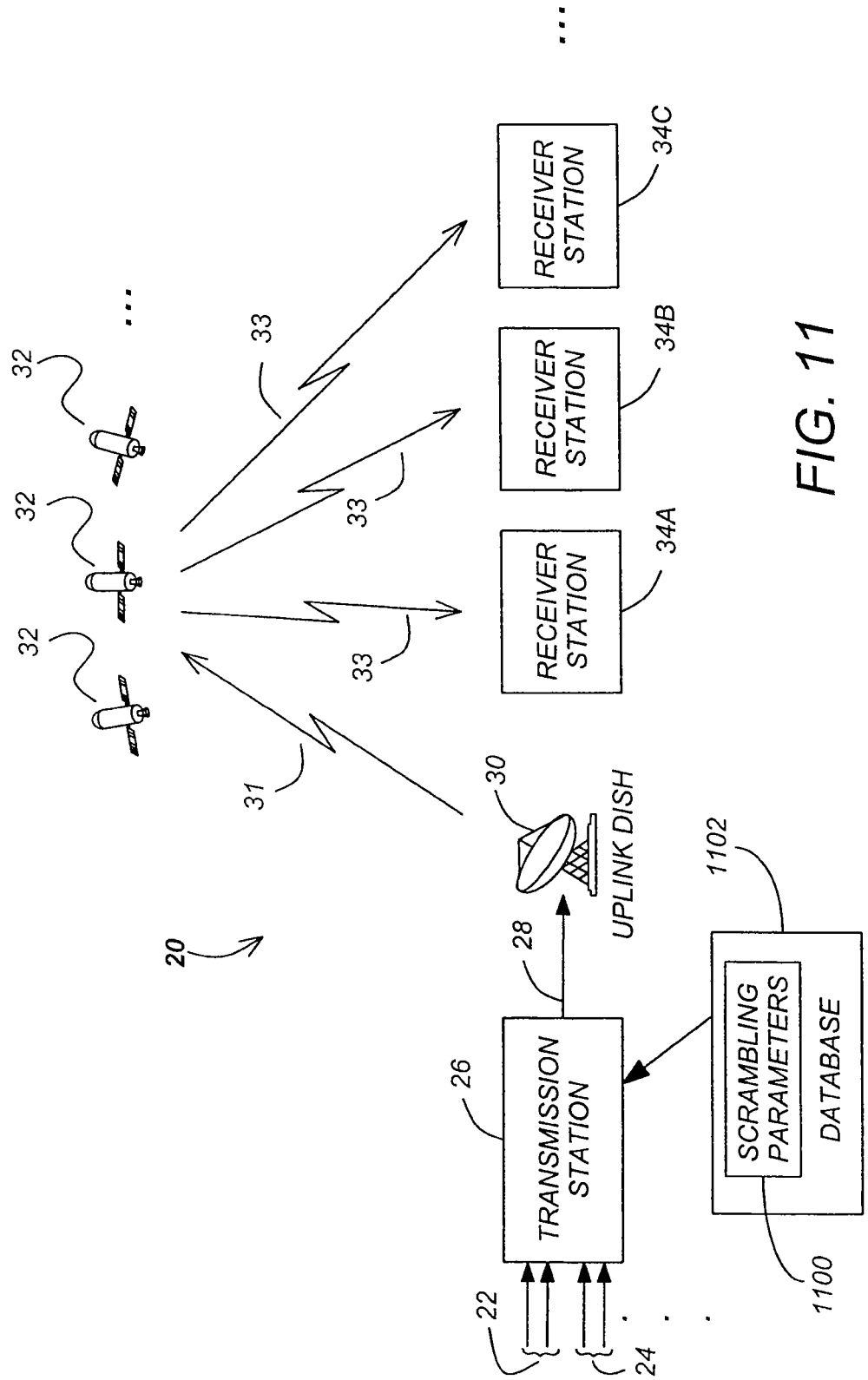
FIG. 11 is a diagram showing various embodiments of the present invention for managing scrambling parameters.

FIG. 11 is a diagram showing various embodiments of the present invention for managing scrambling parameters. In this example, a satellite system 20 includes a transmission station 26 that stores the scrambling parameters 1100 in external memory, i.e., a database 1102, for all carriers utilized in the system 20. The scrambling parameters can be conveyed to receiver stations 34A-34C via satellites 32 using two approaches.

Under the first approach, the receiver 34 maintains all sets of scrambling parameters that correspond to the carriers that is assigned to the receiver 34. In this manner, the transmission station 26 need only indicate the particular entry associated with the proper set of scrambling parameters for the receiver 34 to use for a particular carrier. An update command only indicates the indices for these UW and Gold sequence number in the database 1102 of the receiver 34.

Figure 12:
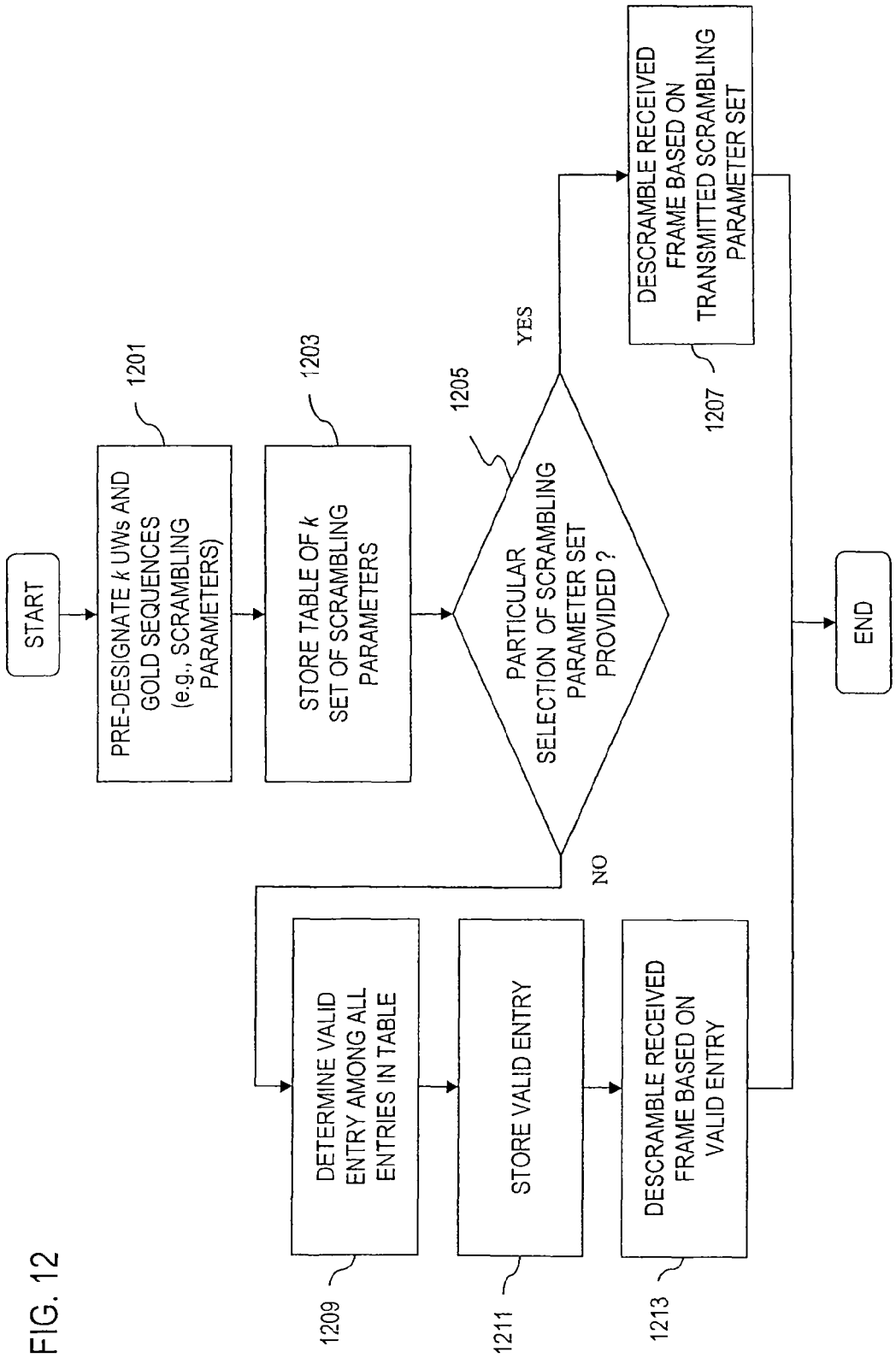
FIG. 12 is a flowchart for descrambling received frames based on pre-designated sets of scrambling parameters, according to an embodiment of the present invention.

The second approach employs a caching mechanism for pre-selected or pre-designated scrambling parameter entries, as explained in FIG. 12. As such, the receiver 34 includes a memory 78 to store the pre-designated set of parameters.

FIG. 12 is a flowchart for descrambling received frames based on pre-designated sets of scrambling parameters, according to an embodiment of the present invention. With this approach, k sets of scrambling parameters corresponding to the carriers to be used by the receiver 34 are pre-selected or pre-designated, as in step 1201. In other words, only k pre-selected UWs and k Gold sequence numbers are stored in a table. The value of k can be configured according to the size of the memory 78. As a result, the transmission station 26 need only transmit $2 \log_2 k$ bits for each carrier. Further, if a fixed association between UW and Gold sequence number is maintained, the number of transmitted bits can be further reduced—one $\log_2 k$ bit number for each carrier. The receiver 34, thus, stores only k sets of scrambling parameters in the memory 78, per step 1203.

With this "cache" concept, the receiver 34 need not be instructed as to a particular set of scrambling parameter by the transmission station 26. At this point, if the receiver 34 determines that the transmission station 26 has indicated such instruction, per step 1205, the receiver 34 retrieves the appropriate scrambling parameter from the memory 78 and descrambles frames received over the specific carrier, as in step 1207.

Alternatively, the receiver 34 can, itself, determine a valid entry, as in step 1209, in the scrambling parameter table within the memory 78, assuming that k is sufficiently small as to not overburden the processing capability of the receiver 34. The receiver 34 can execute a search procedure to step through all the possible k pre-selected sets of UW and Gold sequence numbers stored in the memory 78, without receiving these parameters via a default carrier, when the receiver first tunes to a particular carrier. Once the valid or correct set of UW and Gold sequence number is found for a particular carrier after the search, the information can be stored, per step 1211, in the memory 78 for this carrier. This information is then utilized to descramble the frame (step 1213). Consequently, this valid set of scrambling parameters is used in the future without further search when needed.

Under the above approach, great flexibility is afforded to how the scrambling parameters are conveyed to the receiver 34. The transmission station 26 can update the limited k UW and Gold sequence number sets through over-the-air programming. While there are k internal sets of UW and Gold sequence numbers stored in the memory 78 of the receiver 34, each of the sets can be replaced under remote command by the transmission station 26 with a new UW and Gold sequence number. For example, in a cache update over-the-air, a full length of the UW, and the Gold sequence number (e.g., 18-bits) along with the index is transmitted.

The processes of FIGS. 8-10 and 12 advantageously provide reduced co-channel interference, thereby enhancing receiver performance. These processes can be implemented as software and/or hardware, as explained in FIG. 13.

Alternate Shift Key Modes

Another method of the present invention is to use different shift key modes within each of the data frames 400. Typically, a QPSK transmission mode will be more resistant to PL header 401 interference effects than an 8PSK transmission mode. As such, some of the data frames 400 can be transmitted in a first PSK mode, and other frames 400 can be transmitted in a second PSK mode, which will reduce the number of bits/symbols within the data frames 400 that constructively interfere. Further, individual slots 403, pilot blocks 405, or PL headers 401 can be transmitted in different PSK or ASK modes to further reduce constructive interference, and, thus, reduce or eliminate co-channel interference.

Sensing Phase Track Pull-Off

Another method in accordance with the present invention to reduce co-channel interference effects is to sense when the demodulator 71 or typically, carrier synchronization module 302 within the demodulator 71, is being abruptly or abnormally drawn away from tracking a specific phase of a given coded frame 400. Such a drawing away, or "pulling off" of the phase track would indicate the presence of the interfering data frame, and the carrier synchronization module 302 can then choose not to update the phase track from the PL header 401 or the pilot symbols 405. Although the phase of a given signal or coded frame 400 can change slowly, a reference phase track can be used by the carrier synchronization module 402 to maintain phase track of a given signal if desired.

As such, the present invention can use carrier synchronization module 302 to determine the presence of an interfering coded frame 400, and can either choose to update the carrier synchronization module 302 phase tracking information, or to ignore the phase tracking information, to allow carrier synchronization module 302 to track the already acquired carrier frequency for a given coded frame 400. The carrier synchronization module 302 can use statistical models or other methods to determine how to track the phase of the desired coded frame 400 rather than follow the phase tracking information caused by the presence of the undesired and interfering coded frame 400.

Change in the SOF Sequence

The present invention also envisions that the interfering coded frames 400 can have a different Start-Of-Frame (SOF) sequence and/or scrambling code to those coded frames 400 that may be affected by such co-channel interference. Typically, the SOF is the first twenty-six bits of the ninety bit PL Header 401, but the SOF can be a larger or smaller amount of bits. Further, although changes in the SOF sequence are described, these techniques can be applied to any portion of the PL header 401 if desired. The demodulator 71 can then look for a different SOF in PL header 401 when asked to tune to one or the other of the coded frames 400, and be able to stay locked onto the desired signal and not be pulled off by co-channel interference.

Further, the different SOF sequences can be selected from a group of a limited number of SOF sequences, and this limited number of SOF sequences can be stored in receiver 64 such that receiver 64 can detect or find a specific SOF sequence in a PL header 401 when required.

Transmission Frame Timing Offset

Figure 7:
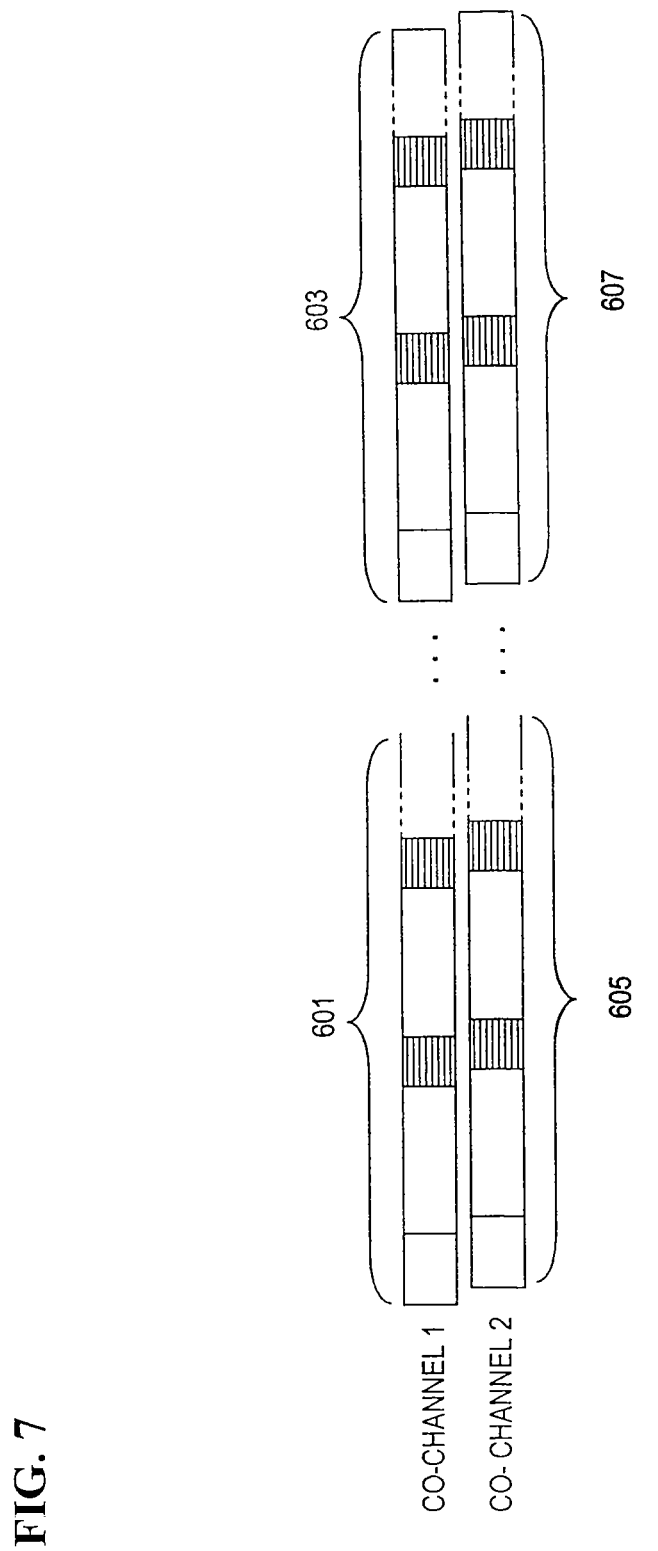
FIG. 7 is a diagram showing the periodic nature of the cross-correlation between co-channel frames, in accordance with an embodiment of the present invention.

As shown in FIG. 7, it is possible to have two frames 601, 605 offset in time. The data frames 400 can be offset in terms of time as shown in FIG. 7, e.g., one data frame 400 starts first, and the interfering data frame 400 is delayed by a certain portion of or whole number of symbols, such that the SOF portion of the PL header 401 will occur at different times for each of the data frames, and not constructively interfere with each other. This will allow the tuner 70 or demodulator 71 to know which of the data frames 400 has been received based on the known time and/or frequency offset for the data frames, or by processing the strongest signal which is presumably the wanted signal, and then demodulate the proper data frame 400. The data frames 400 can be offset by any length longer than one symbol interval.

Transmission Frequency Offset

Another method of the present invention is to offset the transmission frequency of data frames 601, 606 by a small amount, e.g., 1 MHz, so the demodulator 71 can search for the SOF portion of the PL header 401 in a different frequency space for a given data frame 400. The number of offsets, and in which direction, e.g., either up or down in terms of frequency, can be based on the number of data frames 400, or satellite 32 downlink beams, that will be present simultaneously and potentially causing the co-channel interference.

Information Transmission

Figure 13A:
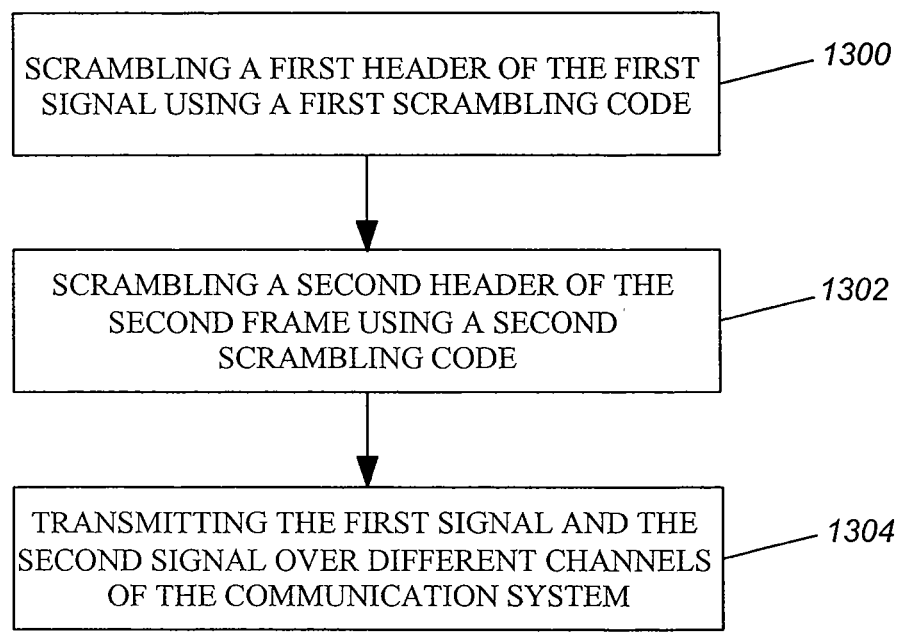
FIGS. 13A and 13B are flowcharts presenting illustrative processes that can be used to transmit information.
Figure 13B:
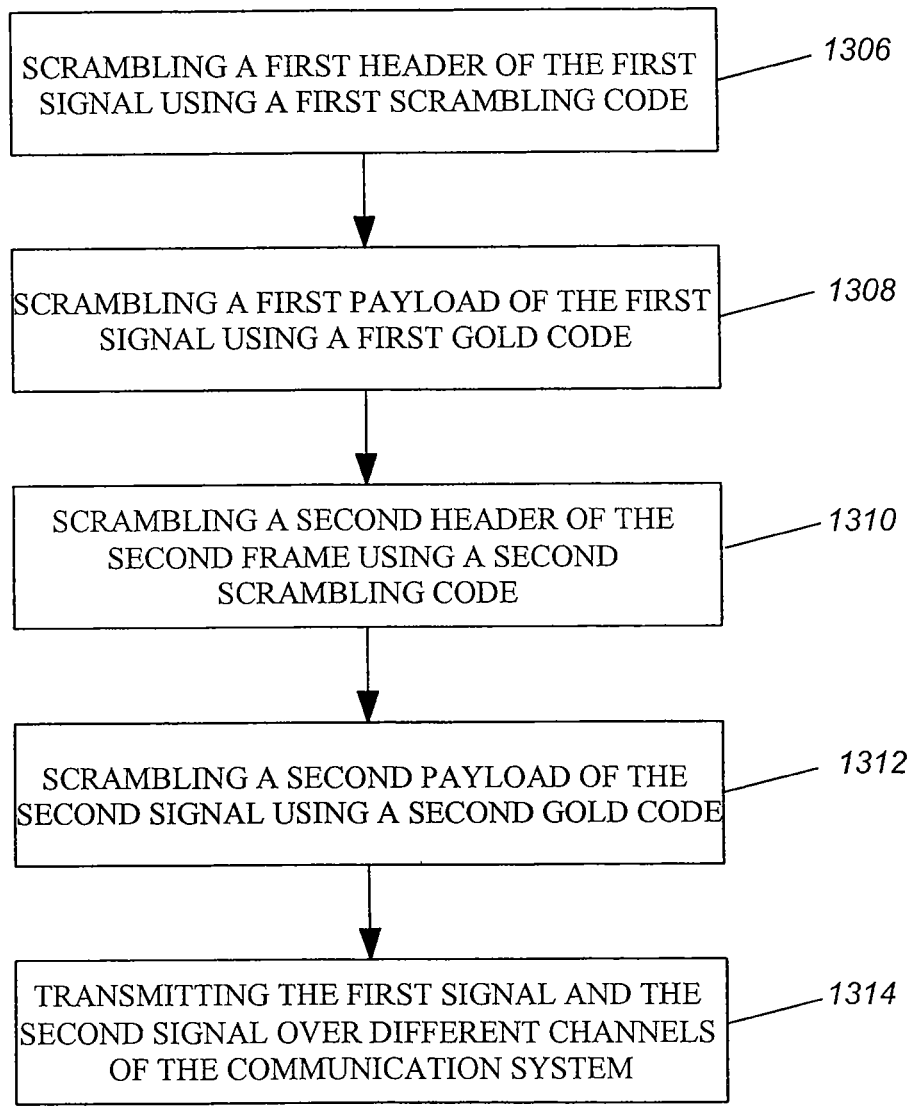

FIGS. 13A-B are flowcharts presenting illustrative processes that can be used to transmit information using the foregoing principles.

FIG. 13A is a flowchart that presents illustrative steps in which the headers of a first and a second signal are scrambled before transmission over different channels. Box 1300 represents scrambling a first header of the first signal using a first scrambling code. Box 1302 represents scrambling a second header of the second signal using a second scrambling code. Box 1304 represents transmitting the first signal and the second signal with the scrambled first header and the scrambled second header over different channels of the communication system.

FIG. 13B is a flowchart that presents illustrative steps in which the headers and payload of the signals are scrambled using scrambling and gold codes, respectively. Box 1306 represents scrambling a first header of the first signal using a first scrambling code. Box 1308 represents scrambling a first payload of the first signal using a first Gold code. Box 1310 represents scrambling a second header of the second signal using a second scrambling code. Box 1312 represents scrambling a second payload of the second signal using a second Gold code. Box 1314 represents transmitting the first signal and the second signal with the scrambled first header and the scrambled second header over different channels of the communication system.

Identification of Co-Channel Interference

Co-channel interference (CCI) can be introduced into a satellite broadcasting network in several ways, including by geographically adjacent spot beam transmissions and crosstalk in different components, such as multiswitches, and cross-polarization. Described herein is a method and system that can detect and possibly identify CCI signals if a dominant CCI exists with an I/N of as low as −4 dB, where I represents the interference power and N represents power from noise, linear distortions, non-linear distortions and other impairments. If the CCI signal is an advanced modulation signal and is coded using LDPC/BCH forward error correction, the technique can identify the interfering signal by processing the statistics of frame synchronization based on the unique scrambling code of the transmitted signal.

The system and method disclosed herein utilizes techniques devised to decode the layered modulation (LM) signal. In the LM technique (described, for example, in U.S. Pat. No. 7,209,524, which is hereby incorporated by reference herein) two signals are transmitted simultaneously with identical or overlapping spectra. The two signals may use the same or different modulation and forward-error-correction schemes, but the two signals have different powers. Processing works by first decoding the higher power signal. If error-free decoding of the signal is successful, the data is re-encoded and the signal is remodulated. Additional impairments, such as carrier frequency offset, linear or nonlinear distortions can also be included in the reconstructed signal. The reconstructed waveform is then subtracted from the composite signal, leaving the lower-power, or interference signal, noise, uncompensated distortions and demodulation errors.

Figure 14:
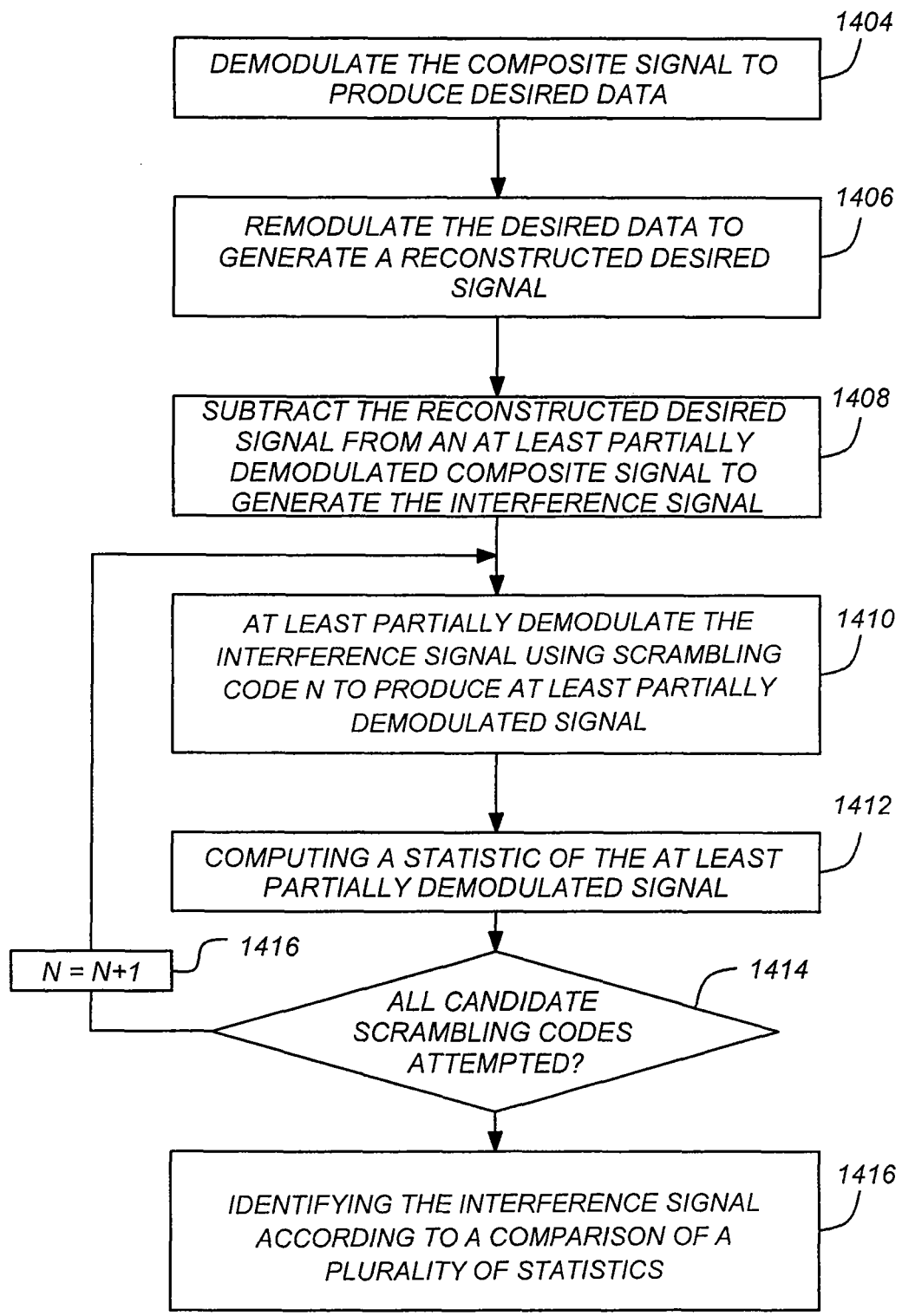
FIGS. 14 and 15 are diagrams depicting a representative technique for identifying co-channel interference, and an embodiment of an apparatus that can be used to perform the technique.
Figure 15:
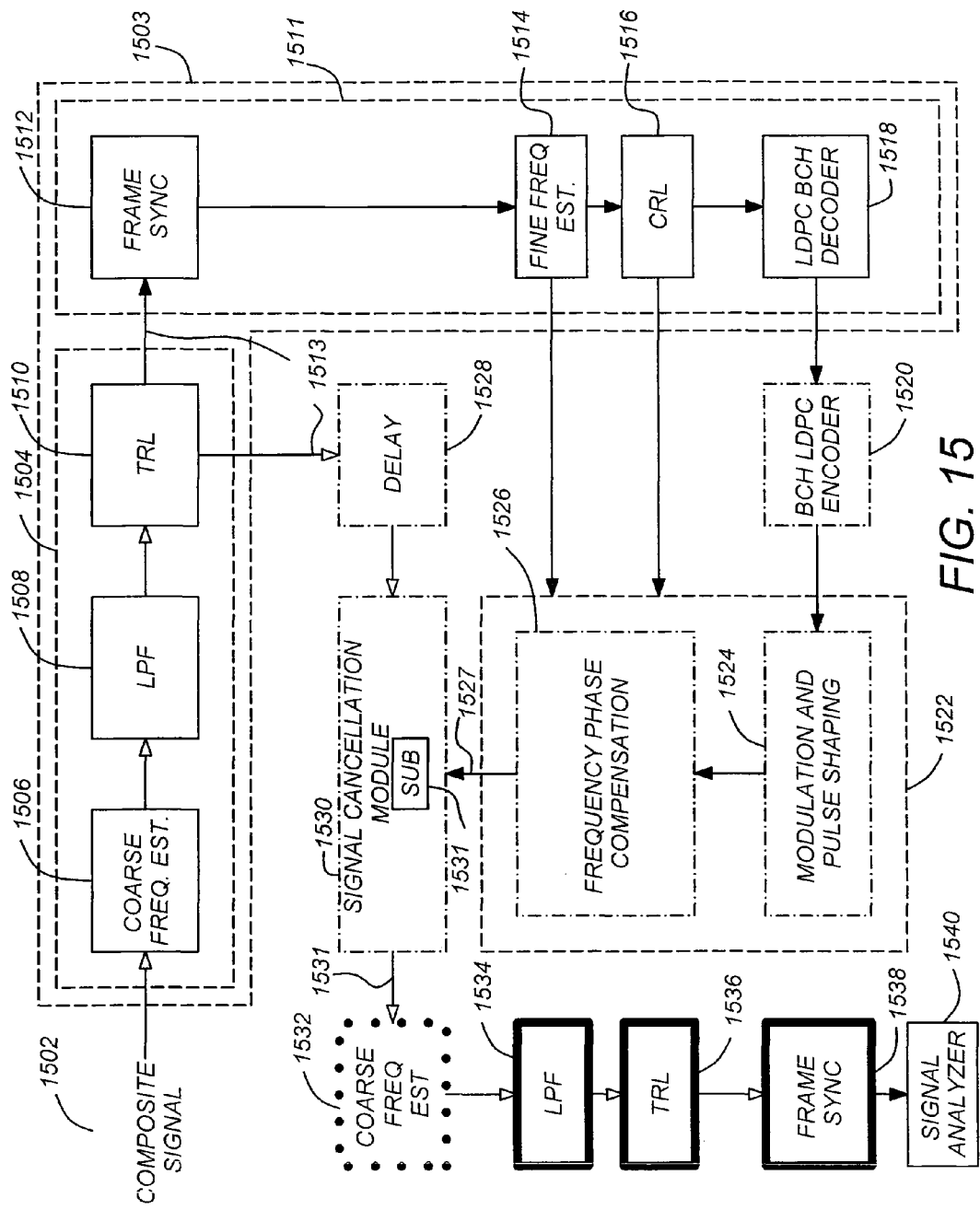

FIGS. 14 and 15 are diagrams depicting a representative technique for identifying co-channel interference, and an embodiment of an apparatus that can be used to perform the technique. In FIG. 15, the blocks with solid borders (1504, 1506, 1508, 1510, 1512, 1514, 1516 and 1518) are associated with the desired signal, the dash-dotted blocks (1520, 1524, 1526, 1528 and 1530) are those that are associated with the extraction of the interference signal, and the bolded blocks (1532, 1534, 1536 and 1538) are associated with the interference signal.

Referring to FIG. 14, the composite signal 1502 is demodulated, as shown in block 1404. The composite signal 1502 includes a desired signal having desired data and interfering signal. The demodulation of the composite signal includes the process of both timing recovery and carrier recovery, hence demodulator 1503 comprises a timing recovery module 1504 and a carrier recovery module 1511 illustrated in FIG. 15.

The timing recovery module 1504 obtains the composite signal 1502 from an antenna 60, which may include a low noise block converter (LNB) for shifting the frequency of the received energy to lower frequencies. The timing recovery module 1504 includes an optional coarse frequency estimator module 1506, a low pass filter module 1508, and a timing recovery loop module 1510.

The coarse frequency estimator module 1506 reduces the uncertainty of the estimate of the carrier frequency of the signal. A delay and multiply (DM) algorithm may be used for this module. The DM algorithm is based on the principle that the carrier frequency can be estimated by the phase difference between two adjacent time samples.

The low pass filter module 1508 low pass filters the signal from the course frequency estimator module to remove noise. The resulting signal is then be applied to an automatic gain control (AGC) module (not shown) so that the input to the timing recovery loop module 1510 is of relatively constant amplitude.

The signal is then applied to a timing recovery loop module 1510 to produce an at least partially demodulated composite signal 1513. The timing recovery loop module 1510 obtains symbol synchronization. To accomplish this, the timing recovery loop module 1510 determines the sampling frequency, and the sampling phase. Determining and locking the sampling frequency requires estimating the symbol period so that samples can be taken at the correct rate. Although the sampling frequency should be known (e.g., the system's symbol rate is typically known), oscillator drift will introduce deviations from the stated symbol rate. Determining and locking the sampling phase involves determining the correct time within a symbol period to take a sample. Due to bandwidth and other limitations, real-world symbol pulse shapes typically have a peak near the center of the symbol period. Sampling the symbol at this peak results in the best signal-to-noise-ratio and will ideally eliminate intersymbol interference from adjacent symbols.

Next, the at least partially demodulated signal 1513 is applied to the carrier recovery module 1511 to complete the demodulation process. The demodulator 1511 includes a frame synchronizer 1512, a fine frequency estimator 1514 and a carrier recovery loop (CRL) 1516.

The frame synchronizer 1512 finds the start of the frame (SOF) for incoming data frames based on the headers (90 symbols) of the physical layer frame (PLFrame). The information required to determine SOF depends on the characteristics of the received signal. The SOF may be determined from the pilot signal, the scrambling code, or other information. The information required to determine the SOF (signal modulation type, whether the pilot is on or off, coding rates, etc.) is typically known apriori.

As all symbols become available when the input signal is read and processed, the probability of frame detection is typically 99% at a CNR=1 dB, and the false detection probability is typically less than 1%. For a CNR as low as −4 dB, detection probability is about 36%. These statistics can be used in the identification of the scrambling ID even though the signal being identified is deeply buried in background noise.

The output of the frame synchronizer 1512 is provided to a fine frequency estimation module 1514. This module further reduces the frequency uncertainty to assure that the carrier recovery that follows will be relatively error free, especially for 8PSK modes with pilots. The output of this module is provided to the carrier recovery loop (CRL) module 1516.

The CRL module 1516 removes the residual sinusoidal carrier signal in the composite signal 1502. Demodulating the received signal is mostly accomplished using a local oscillator and a mixer in the tuner. Ideally, the oscillator used to modulate the signal and the oscillator used in the CRL module 1516 to demodulate the received signal are synchronized in frequency and phase. However, in practice, the frequency of either the modulating oscillator or the local oscillator may change or drift with time. Therefore, instead of demodulation bringing the signal to baseband, the signal will be near baseband with some frequency offset, causing the received signal constellation to rotate. The CRL module 1516 removes this frequency offset using a closed loop system, thus allowing the signal to be processed at baseband without any rotation.

If the composite signal 1502 was encoded, the output of the CRL module 1516 is decoded by decoder 1518, thus producing the desired data.

Referring again to FIG. 14, the desired data is remodulated to generate a reconstructed desired signal 1527, as shown in block 1406. This can be accomplished by remodulator 1522 shown in FIG. 15. If the composite signal 1502 was coded, the desired data is re-encoded by encoder 1520 before being provided to the remodulator 1522. The remodulator 1522 remodulates the data to generate the reconstructed desired signal 1527. This reconstructed desired signal is later subtracted from the at least partially demodulated signal 1513. The reconstructed desired signal may be optionally pulse shaped by the modulation and pulse shaping module 1524 and compensated in both phase and frequency by the frequency and phase compensation module 1526 using information from the fine frequency estimation module 1514 and the CRL module 1516.

Referring again to FIG. 14, the reconstructed desired signal is subtracted from the at least partially demodulated composite signal to generate an interference signal 1531, as shown in block 1408. This can be accomplished by the signal cancellation module 1530 depicted in FIG. 15. In one embodiment, the signal cancellation module 1530 comprises a subtractor (1531) for subtracting the reconstructed desired signal 1527 from the received signal 1513, and may also comprise further modules that compensate for transmission channel non-linearities and distortions.

The processing required to perform the operations depicted in blocks 1511 and 1522 can take an significant amount of time. Hence, the received signal 1513 may be delayed by delay module 1528 by the same amount of time to assure that the subtraction of the reconstructed desired signal 1527 from the received signal 1513 provides the interference signal 1531 as desired.

To identify the signal, a plurality (N) of scrambling codes are used to at last partially demodulate the interference signal 1531, and the statistics of a forced SOF detection resulting from the application of each scrambling code is examined. When the incorrect scrambling code is used, the resulting SOF will be randomly distributed in time, but when the correct scrambling code is used, the SOF will be systematically distributed in time.

The interference signal is at least partially demodulated, using a first one of N scrambling codes to generate an at least partially demodulated interference signal, as shown in block 1410. The partial demodulation of the interference signal can be performed by blocks 1532-1538 of FIG. 15. In this embodiment, the interference signal is supplied to a coarse frequency estimator 1532, which operates analogously to the coarse frequency estimator 1506 of the timing recovery module 1504 in that it reduces the uncertainty of the estimate of the signal carrier frequency (in this case, the interference signal carrier). Next, the signal is supplied to a low pass filter 1534 and a timing recovery loop 1536, and a frame synchronizer 1538, which perform operations analogous to those of the low pass filter 1508, timing recovery loop 1510, and frame synchronizer 1512, respectively.

A statistic of the at least partially demodulated interference signal is generated as shown in block 1412. This can be accomplished, for example by the signal analyzer 1540 shown in FIG. 15.

Steps 1410-1412 are repeated with another one of the N scrambling codes until all candidate scrambling codes are attempted, as shown in blocks 1412 and 1414. This results in a plurality of statistics for each of the candidate scrambling codes. Finally, as shown in block 1416, the interference signal is identified by comparing the statistics generated for each of the scrambling codes.

In one embodiment, the statistic of the at least partially demodulated interference signal is a synchronization statistic. For example, the at least partially demodulated interference signal may comprise a plurality of frames, each with a detected SOF time. In this case, the statistic generated for each scrambling code may be referenced to the start SOF time from all subsequent SOFs of the partially demodulated signal.

Figure 16:
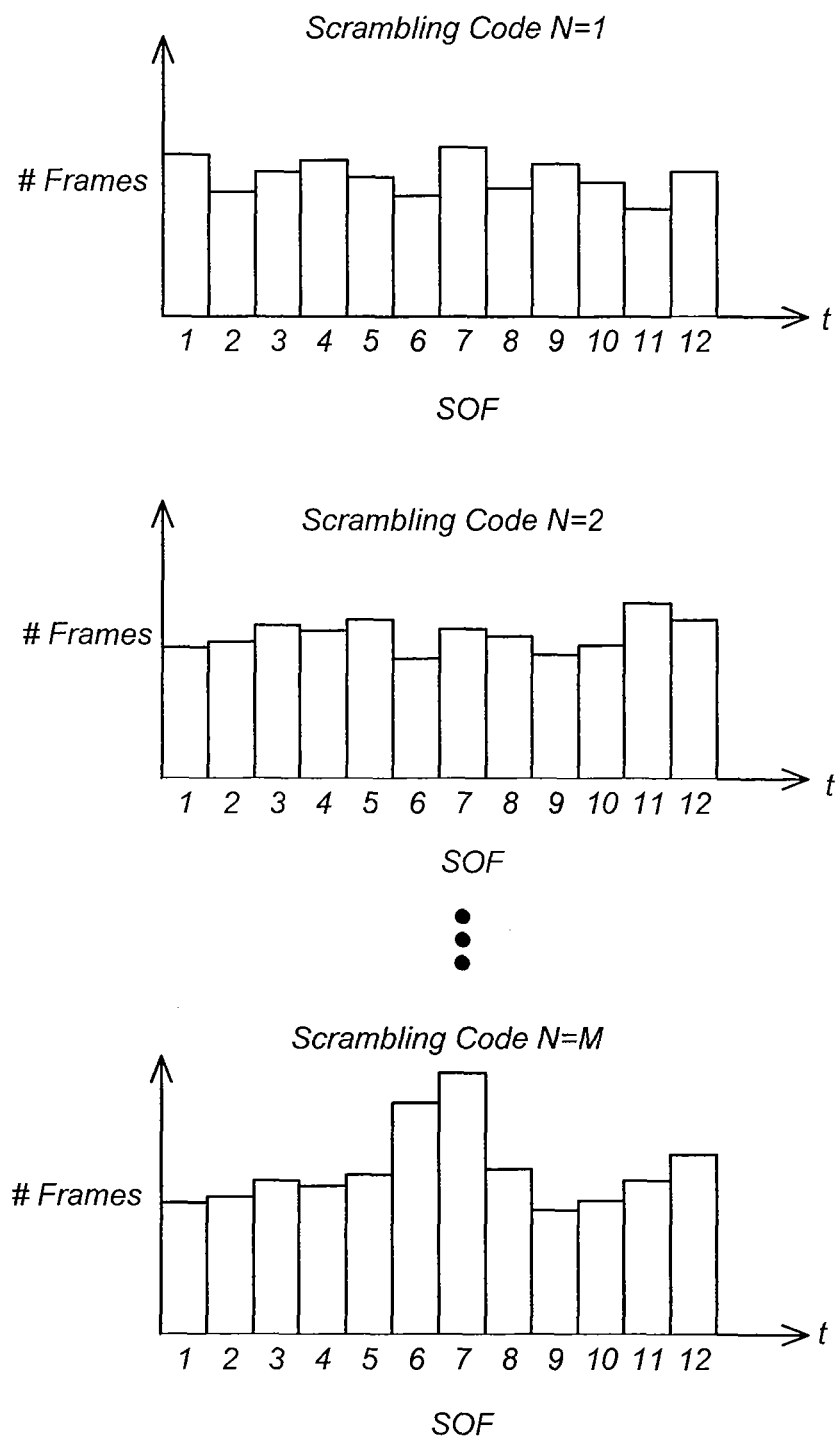
FIG. 16 is a diagram illustrating exemplary statistics for a partially demodulated interference signal.

FIG. 16 is a diagram illustrating exemplary statistics for the at least partially demodulated interference signal. The uppermost plot is a histogram illustrating 12 time "bins" for the SOF time, and indicates the number of frames for which the SOF occurred within that time bin. For example, the top histogram indicates that more frames had a SOF in the time interval corresponding to bin 1 than in bin 2. The greatest number of frames had a SOF time within bin 7 and the fewest within bin 11. However, although the top plot includes a bin having the greatest number of frame (bin 7) and one with the fewest number of bins (bin 11), none of the bins has a substantially greater number of frames than the other bins. This is also the case with the middle histogram (generated with a second scrambling code). In contrast, the bottom histogram (generated for scrambling code M) shows that two of the bins (6 and 7) have significantly more frames than the rest (1-5 and 8-12). This is an indication that scrambling code M belongs to the interference signal. Using a table, database, or other relationship stored in the receiver that maps the scrambling code to the signal, the interference signal can be thus identified as the signal associated with scrambling code M.

In the above-described embodiment, histograms of the SOF timing were compared to identify the interference signal. However, the present invention may be practiced using other statistics. For example, instead of generating histograms of the SOF time, the system may simply generate a variance (or standard deviation) of the SOF time for each scrambling code, and identify the interfering signal as the signal associated with the scrambling code resulting in the lowest variance for the SOF time.

Figure 17:
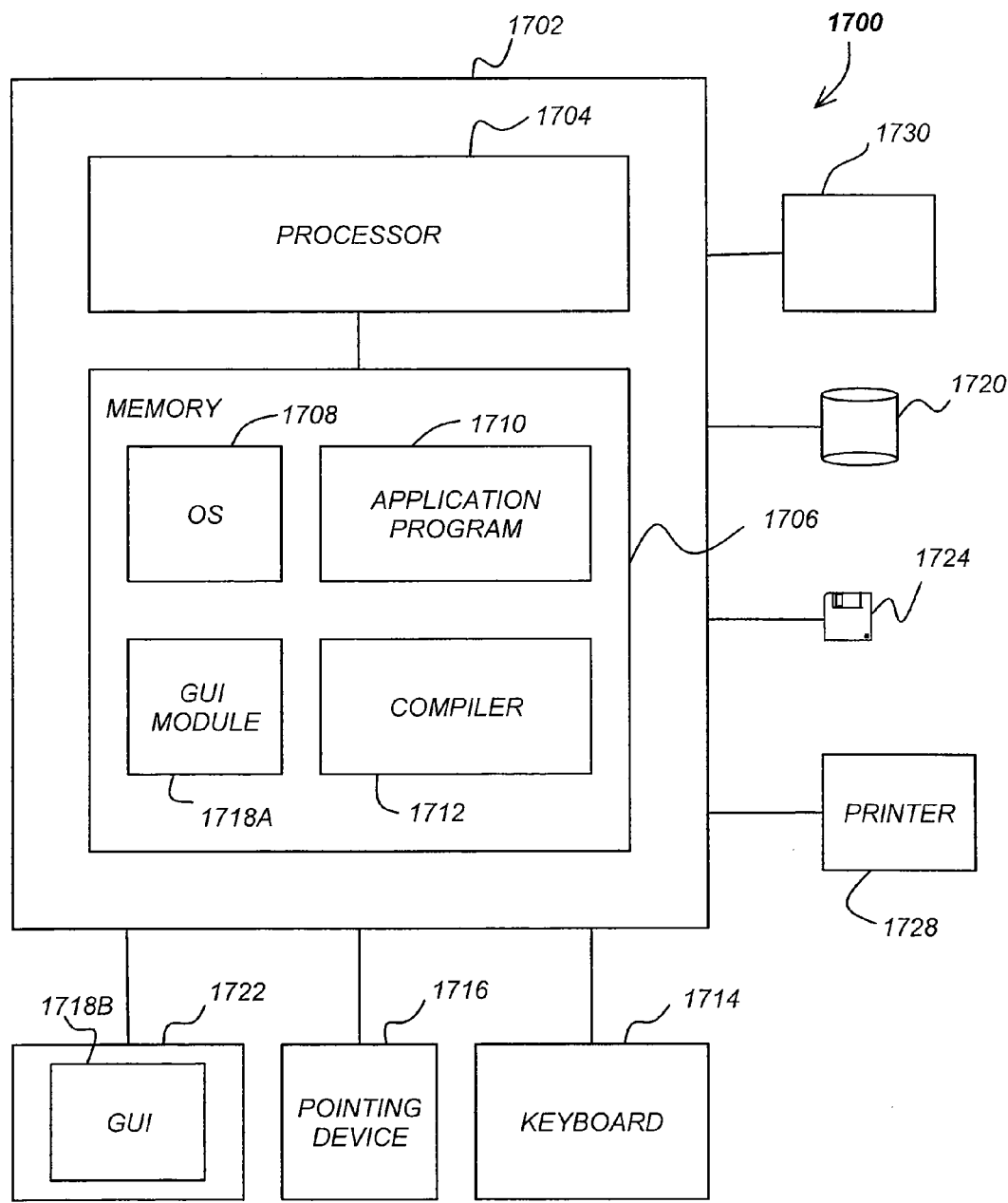
FIG. 17 is a diagram illustrating an exemplary computer system that can be used to implement aspects of the present invention.

FIG. 17 illustrates an exemplary computer system 1700 that could be used to implement the present invention. The computer 1702 comprises a processor 1704 and a memory, such as random access memory (RAM) 1706. The computer 1702 is operatively coupled to a display 1722, which presents images such as windows to the user on a graphical user interface 1718B. The computer 1702 may be coupled to other devices, such as a keyboard 1714, a mouse device 1716, a printer, etc. Of course, those skilled in the art will recognize that any combination of the above components, or any number of different components, peripherals, and other devices, may be used with the computer 1702.

Generally, the computer 1702 operates under control of an operating system 1708 stored in the memory 1706, and interfaces with the user to accept inputs and commands and to present results through a graphical user interface (GUI) module 1718A. Although the GUI module 1718A is depicted as a separate module, the instructions performing the GUI functions can be resident or distributed in the operating system 1708, the computer program 1710, or implemented with special purpose memory and processors. The computer 1702 also implements a compiler 1712 which allows an application program 1710 written in a programming language such as COBOL, C++, FORTRAN, or other language to be translated into processor 1704 readable code. After completion, the application 1710 accesses and manipulates data stored in the memory 1706 of the computer 1702 using the relationships and logic that was generated using the compiler 1712. The computer 1702 also optionally comprises an external communication device such as a modem, satellite link, Ethernet card, or other device for communicating with other computers.

In one embodiment, instructions implementing the operating system 1708, the computer program 1710, and the compiler 1712 are tangibly embodied in a computer-readable medium, e.g., data storage device 1720, which could include one or more fixed or removable data storage devices, such as a zip drive, floppy disc drive 1724, hard drive, CD-ROM drive, tape drive, etc. Further, the operating system 1708 and the computer program 1710 are comprised of instructions which, when read and executed by the computer 1702, causes the computer 1702 to perform the steps necessary to implement and/or use the present invention. Computer program 1710 and/or operating instructions may also be tangibly embodied in memory 1706 and/or data communications devices 130, thereby making a computer program product or article of manufacture according to the invention. As such, the terms "article of manufacture," "program storage device" and "computer program product"

as used herein are intended to encompass a computer program accessible from any computer readable device or media.

CONCLUSION

In summary, the present invention comprises methods and apparatuses for minimizing co-channel interference in communications systems. It is intended that the scope of the invention be limited not by this detailed description, but rather by the claims appended hereto and the equivalents thereof. The above specification, examples and data provide a complete description of the manufacture and use of the composition of the invention. Since many embodiments of the invention can be made without departing from the spirit and scope of the invention, the invention resides in the claims hereinafter appended and the equivalents thereof.

What is claimed is:

1. In a system receiving a composite signal comprising a desired signal having a desired frame including desired synchronization data and an interference signal, a method of receiving the desired signal and rejecting the interference signal, comprising the steps of:
    demodulating the composite signal;
    acquiring a phase of the desired synchronization data of the demodulated composite signal;
    tracking the acquired phase of the demodulated composite signal according to phase tracking information;
    sensing if the tracked phase of the demodulated composite signal is being drawn away from the desired signal by the interference signal; and
    choosing whether to update the phase tracking information according to whether the tracked phase of the demodulated composite signal is sensed to be being drawn away from the desired signal by the interference signal;
    wherein the sensing if the tracked phase of the demodulated composite signal is being drawn away from the desired signal by the interference signal is performed according to a statistical model of an expected phase of the desired synchronization data.

2. In a system receiving a composite signal comprising a desired signal having a desired frame including desired synchronization data and an interference signal, a method of receiving the desired signal and rejecting the interference signal, comprising the steps of:
    demodulating the composite signal;
    acquiring a phase of the desired synchronization data of the demodulated composite signal;
    tracking the acquired phase of the demodulated composite signal according to phase tracking information;
    sensing if the tracked phase of the demodulated composite signal is being drawn away from the desired signal by the interference signal; and
    choosing whether to update the phase tracking information according to whether the tracked phase of the demodulated composite signal is sensed to be being drawn away from the desired signal by the interference signal;
    updating the phase tracking information only if the tracking of the acquired phase of the demodulated composite signal is not drawn away from the desired signal by the interference signal;
    wherein the interference signal comprises an interfering frame including interfering synchronization data and wherein:
    the step of sensing if the tracked the phase of the demodulated composite signal is being drawn away from the desired signal by the interference signal comprises the step of:
        sensing if the tracked phase of the demodulated composite signal is drawn away from a phase of the desired synchronization data and to a phase of the interfering synchronization data;
    the step of updating the phase tracking information only if the tracking of the acquired phase of the demodulated composite signal is not drawn away from the desired signal by the interference signal comprises the step of:
        updating the phase tracking information only if the tracking of the acquired phase of the demodulated composite signal is not drawn away from the phase of the desired synchronization data and to the phase of the interfering synchronization data.

3. In a system receiving a composite signal comprising a desired signal having a desired frame including desired synchronization data and an interference signal, an apparatus for receiving the desired signal and rejecting the interference signal, comprising:
    a demodulator for demodulating the composite signal, acquiring a phase of the desired synchronization data of the demodulated composite signal, and for tracking the acquired phase of the demodulated composite signal according to phase tracking information; and
    a carrier synchronization module for sensing if the tracked phase of the demodulated composite signal is being drawn away from the desired signal by the interference signal, and for choosing whether to update the phase tracking information according to whether the tracked phase of the demodulated composite signal is sensed to be being drawn away from the desired signal by the interference signal;
    wherein the carrier synchronization module senses if the tracked phase of the demodulated composite signal is being drawn away from the desired signal by the interference signal according to a statistical model of an expected phase of the desired synchronization data.

4. In a system receiving a composite signal comprising a desired signal having a desired frame including desired synchronization data and an interference signal, an apparatus for receiving the desired signal and rejecting the interference signal, comprising:
    a demodulator for demodulating the composite signal, acquiring a phase of the desired synchronization data of the demodulated composite signal, and for tracking the acquired phase of the demodulated composite signal according to phase tracking information; and
    a carrier synchronization module for sensing if the tracked phase of the demodulated composite signal is being drawn away from the desired signal by the interference signal, and for choosing whether to update the phase tracking information according to whether the tracked phase of the demodulated composite signal is sensed to be being drawn away from the desired signal by the interference signal;
    wherein the carrier synchronization module updates the phase tracking information only if the tracking of the acquired phase of the demodulated composite signal is not drawn away from the desired signal by the interference signal; and
    wherein the interference signal comprises an interfering frame including interfering synchronization data and wherein the carrier synchronization module:

senses if the tracked the phase of the demodulated composite signal is being drawn away from the desired signal by the interference signal by sensing if the tracked phase of the demodulated composite signal is drawn away from a phase of the desired synchronization data and to a phase of the interfering synchronization data; and updates the phase tracking information only if the tracking of the acquired phase of the demodulated composite signal is not drawn away from the desired signal by the interference signal by updating the phase tracking information only if the tracking of the acquired phase of the demodulated composite signal is not drawn away from the phase of the desired synchronization data and to the phase of the interfering synchronization data.

* * * * *